United States Patent
Sekido et al.

(10) Patent No.: US 9,463,587 B2
(45) Date of Patent: Oct. 11, 2016

(54) METHODS OF RTM MOLDING

(71) Applicants: Toray Industries, Inc., Tokyo (JP); Mitsubishi Heavy Industries, Ltd., Tokyo (JP)

(72) Inventors: Toshihide Sekido, Otsu (JP); Kazuaki Kitaoka, Ehime (JP); Hiroshi Odani, Ehime (JP); Shigeru Nishiyama, Nagoya (JP); Masahiko Shimizu, Nagoya (JP)

(73) Assignees: Toray Industries, Inc. (JP); Mitsubishi Heavy Industries, Ltd. (JP)

( * ) Notice: Subject to any disclaimer, the term of this patent is extended or adjusted under 35 U.S.C. 154(b) by 552 days.

(21) Appl. No.: 13/833,606

(22) Filed: Mar. 15, 2013

(65) Prior Publication Data

US 2013/0207316 A1 Aug. 15, 2013

Related U.S. Application Data

(62) Division of application No. 10/530,263, filed as application No. PCT/JP03/12947 on Oct. 9, 2003, now Pat. No. 8,420,002.

(30) Foreign Application Priority Data

| Oct. 9, 2002 | (JP) | 2002-295932 |
| Oct. 9, 2002 | (JP) | 2002-295933 |
| Oct. 9, 2002 | (JP) | 2002-295934 |
| Oct. 28, 2002 | (JP) | 2002-312454 |

(51) Int. Cl.
*B29C 70/48* (2006.01)
*B29C 45/00* (2006.01)
(Continued)

(52) U.S. Cl.
CPC ......... *B29C 45/0005* (2013.01); *B29C 70/443* (2013.01); *B29C 70/547* (2013.01); *B29C 70/548* (2013.01); *B29C 70/68* (2013.01)

(58) Field of Classification Search
None
See application file for complete search history.

(56) References Cited

U.S. PATENT DOCUMENTS 2,913,036 A 11/1959 Smith
3,975,479 A 8/1976 McClean
(Continued)

FOREIGN PATENT DOCUMENTS

GB 2360483 A * 9/2001
JP 56-127426 A 10/1981
(Continued)

OTHER PUBLICATIONS

Hoebergen, A. et al., "Vacuum Infusion," *D.B. Miracle and S.L. Donaldson (ASM Handbook: "Composites")*, Dec. 2001, vol. 21, pp. 501-515.

(Continued)

*Primary Examiner* — Ryan Ochylski
(74) *Attorney, Agent, or Firm* — DLA Piper LLP (US)

(57) ABSTRACT

A method of RTM molding includes placing a reinforcing fiber substrate in a mold, placing resin distribution media exhibiting a resin flow resistance lower than a resin flow resistance of said reinforcing fiber substrate on both surfaces of said reinforcing fiber substrate, and after pressure in said mold is reduced by evacuation, injecting a resin into said mold through said resin distribution media to impregnate said reinforcing fiber substrate with said resin injected, wherein resin flow resistance of a first resin distribution medium placed on a first surface of said reinforcing fiber substrate is lower than resin flow resistance of a second resin distribution medium placed on a second surface of said reinforcing fiber substrate, and said evacuation is carried out through said second resin distribution medium while said resin is injected into said first resin distribution medium to impregnate said reinforcing fiber substrate with said resin injected.

15 Claims, 11 Drawing Sheets

(51) Int. Cl.
  *B29C 70/44*  (2006.01)
  *B29C 70/54*  (2006.01)
  *B29C 70/68*  (2006.01)

(56) References Cited

U.S. PATENT DOCUMENTS

| | | |
|---|---|---|
| 4,902,215 A | 2/1990 | Seemann, III |
| 4,942,013 A | 7/1990 | Palmer et al. |
| 5,052,906 A | 10/1991 | Seemann |
| 5,403,537 A | 4/1995 | Seal et al. |
| 5,565,162 A | 10/1996 | Foster |
| 5,576,030 A | 11/1996 | Hooper |
| 5,968,445 A | 10/1999 | McCarville et al. |
| 6,843,953 B2 | 1/2005 | Filsinger et al. |
| 2001/0009313 A1 | 7/2001 | Mcclure et al. |
| 2002/0020934 A1 | 2/2002 | Hinz |
| 2003/0025232 A1* | 2/2003 | Slaughter ............. B29C 70/443 264/102 |
| 2003/0227107 A1 | 12/2003 | Stewart |
| 2005/0035478 A1 | 2/2005 | Sewell et al. |

FOREIGN PATENT DOCUMENTS

| | | |
|---|---|---|
| JP | 08-25386 A | 1/1996 |
| JP | 2000-145042 | 5/2000 |
| JP | 2001-64406 A | 3/2001 |
| JP | 2002-172630 A | 6/2002 |
| WO | 01/00392 A1 | 1/2001 |

OTHER PUBLICATIONS

Mazumdar, S., "Chapter 7. Process Models," *Composites Manufacturing. Boca Raton, CRC Press*, 2002.

* cited by examiner

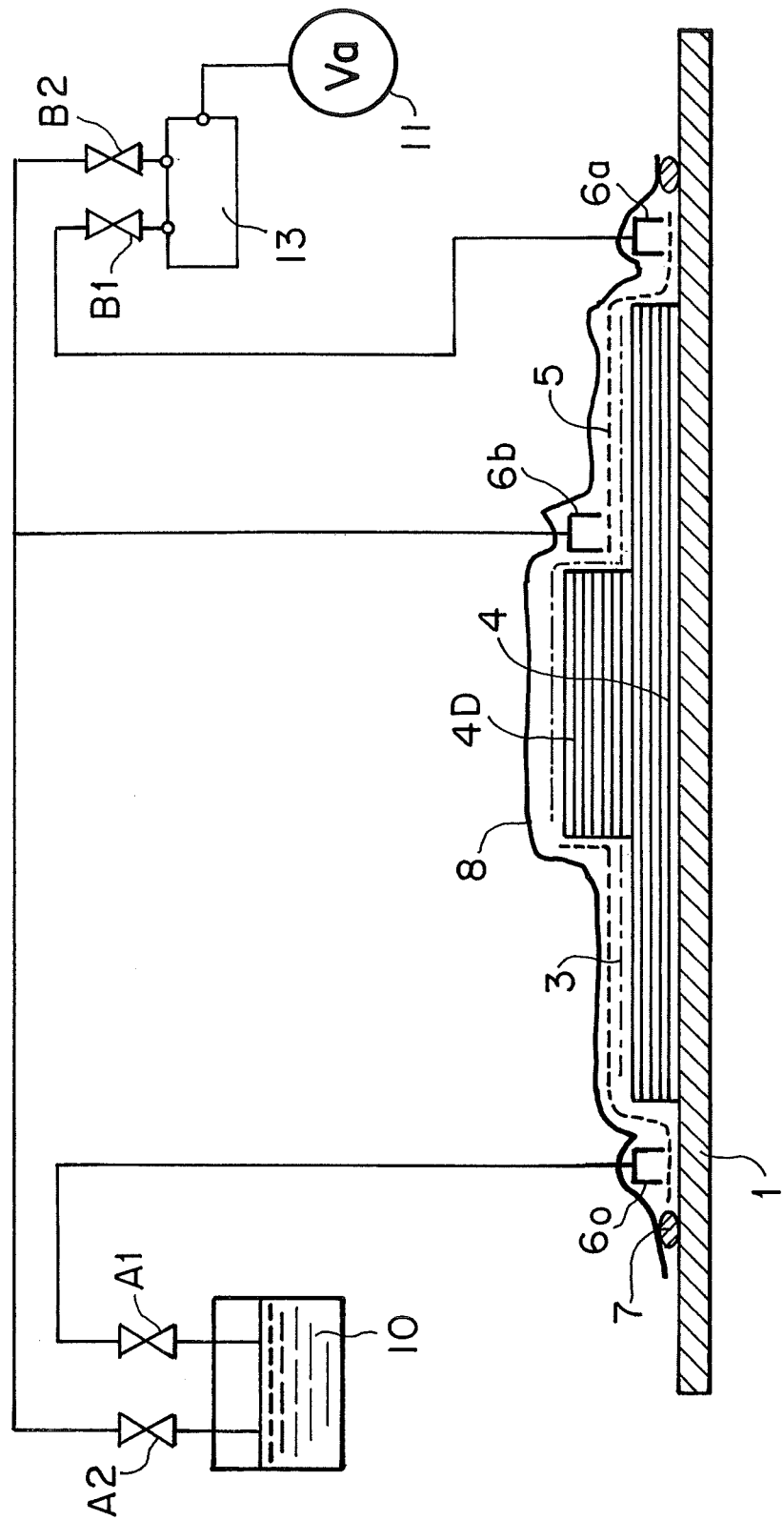

METHODS OF RTM MOLDING

RELATED APPLICATIONS

This is a divisional application of U.S. application Ser. No. 10/530,263 filed Apr. 5, 2005, which is a §371 of International Application No. PCT/JP2003/012947, with an international filing date of Oct. 9, 2003 (WO 2004/033176 A1, published Apr. 22, 2004), which is based on Japanese Patent Application Nos. 2002-295932, filed Oct. 9, 2002, 2002-295933, filed Oct. 9, 2002, 2002-295934, filed Oct. 9, 2002, and 2002-312454, filed Oct. 28, 2002, the subject matter of which is incorporated by reference.

TECHNICAL FIELD

This disclosure relates to improvement of a method of Resin Transfer Molding (hereinafter, referred to as "RTM") for molding a structural material of a fiber reinforced plastic (hereinafter, referred to as "FRP"), and specifically, to a method of RTM molding in which it is possible to mold a thick material and, further, it is possible to improve a quality of surface property or to increase a fiber volume content (hereinafter, also referred to as "Vf") of an FRP molded material to be molded. Although the title refers to "methods of RTM molding" the methods include both a molding method for RTM itself and a method of producing an FRP molded material using the molding method.

BACKGROUND

Although FRP has been used in various fields, as a method of producing an FRP structural material, general is a so-called "prepreg/autoclave molding" method wherein, after a preform having a shape of a structural material to be molded is formed beforehand by prepregs, the preform is cured in an autoclave set at a predetermined condition in temperature and pressure. However, recently a method of RTM molding reduces production costs, and that method is developed gradually. Many methods are proposed as RTM molding methods of producing panels and beam materials which are structural members for airplanes or architecture requiring high strength, lightweight and low cost or of producing FRP molded products such as outer panels of vehicles. For example, there are a methods of RTM molding for molding a large FRP structural material (for example, JP-A 12-145042) and a method of RTM molding using a resin distribution medium (for example, U.S. Pat. No. 5,052,906).

In the method of RTM molding disclosed in JP-A 12-145042, peel plys/resin distribution media are disposed on both surfaces of a reinforcing fiber substrate comprising a laminate of reinforcing fiber materials, the whole thereof is covered with a bag material, and a resin injection gate and an evacuation gate for reducing a pressure are provided relative to the inside covered with the bag material. In this state, under a condition of a room temperature or a heated atmosphere, a resin is injected from the resin injection gate while being reduced in pressure by evacuating the inside of the bag material through the evacuation gate. The resin flows from the upper surface side to the lower surface side of the reinforcing fiber substrate or from the lower surface side to the upper surface side to impregnate the resin into the reinforcing fiber substrate. After completion of impregnation, the resin is cured at room temperature or under a heated atmosphere condition and, after curing, the molded product is taken out from the mold by removing the bag material.

As the problem in the above-described molding method, although resin distribution media are disposed on both surfaces of the reinforcing fiber substrate, because the resin impregnation is basically carried out from one surface side relative to the reinforcing fiber substrate, there is a limit in the distance capable of being impregnated in the thickness direction of the substrate. Therefore, if the reinforcing fiber substrate is too thick, a predetermined impregnation becomes impossible.

It is known that permeability of resin into the reinforcing fiber substrate can be determined generally by the following equation.

$$I=(\epsilon/(1-\epsilon))\sqrt{(\alpha P/2)} \times \int[dt\sqrt{(\mu(t)t)}]$$

I: permeability, $\epsilon$: resistance of substrate, $\alpha$: constant,
P: vacuum pressure in substrate, $\mu(t)$: viscosity,
t: expiration time Permeability corresponds to a distance (thickness) of resin impregnation into the substrate.

With respect to resin impregnation into a reinforcing fiber substrate, although the constant and viscosity in the above-described equation are different depending on the kinds of the substrate and the resin, because the impregnation distance is astringent accompanying with expiration of time and, further, there occurs an increase of the viscosity and the resin gradually becomes a gel, a limit is generated in the distance in which the resin can impregnate and, if the thickness of the reinforcing fiber substrate is a certain thickness or more, it becomes impossible to impregnate the resin any longer in the above-described conventional method.

To impregnate the resin into a thick reinforcing fiber substrate, it is considered to impregnate the resin into the reinforcing fiber substrate from both the resin distribution media on both surfaces of the reinforcing fiber substrate. In the above-described molding method, however, because the resin distribution media having substantially the same shape and property are disposed on both surfaces, when merely the resin is impregnated from both surface sides, the resin is impregnated in the thickness direction of the substrate simultaneously and, in a same manner, voids are hard to be pushed out in the side directions, and the voids are likely to be enclosed in the substrate. If the voids are enclosed, it is difficult to obtain a target property of a molded product. To avoid such an enclosure of voids, the resin impregnation is carried out basically from one surface side.

Further, as another problem on the above-described molding method, it is difficult to obtain good flatness on the design surface of the molded product. Namely, the above-described resin distribution medium is formed as a member having a relatively large surface irregularity with a low resistance for gas permeation to increase the resin distribution property. However, if the resin distribution media having such a relatively large surface irregularity are disposed on both surfaces of the reinforcing fiber substrate and the molding is carried out in this condition, the relatively large surface irregularity of the resin distribution medium is reflected to the design surface which is one surface of the molded product. As a result, the designability is damaged and an irregularity is formed on the surface of the molded product. Therefore, there is a problem that the properties such as aerodynamic property decrease.

To solve such problems, it is considered to use a resin distribution medium having a small surface irregularity, but if done so, the resistance for gas permeation becomes too great and, a target resin distribution property cannot be obtained. Further, because gas permeation from the reinforcing fiber substrate at the time of evacuation also deteriorates, the vacuum degree does not increase and it becomes difficult to completely impregnate the resin in the thickness direction particularly for a thick substrate.

Thus, although the degree of the irregularity of the resin distribution medium affects the resin distribution and gas permeation performances, the irregularity of the resin distribution medium for improving resin distribution and gas permeation performances (a relatively large irregularity) and the irregularity of the resin distribution medium for improving the surface property of the molded product (a relatively small irregularity) are in a relationship opposite to each other. Therefore, in a conventional method wherein substantially the same resin distribution media are disposed on both surfaces of a reinforcing fiber substrate, it is difficult to achieve both an increase in the resin impregnation property and improvement of the surface property of a molded product and it becomes particularly difficult in the molding using a thick reinforcing fiber substrate.

To improve quality on the surface property of a molded product, a condition is frequently employed wherein a gas permeable material is not disposed on a tool surface side. In such a case, however, because the gas permeation in the substrate deteriorates and the vacuum degree does not increase, reduction in impregnation may occur.

In the method of RTM molding disclosed in U.S. Pat. No. 5,052,906, a reinforcing fiber substrate is placed on a mold and a resin distribution medium is disposed at a position opposite the mold, a resin injection port and an evacuation port are disposed, they are covered with a bag material from the upper side, and a matrix resin is injected where the inside of a cavity is reduced in pressure by evacuation. The flowing-in route of the resin into the substrate is formed as a route in which the resin is distributed mainly from the injection port along the surface direction of the substrate disposed in the mold and the distributed resin is impregnated in the thickness direction of the substrate.

In the above-described method, when the resin injection is carried out at a so-called "high Vf" condition where the fiber volume content (Vf) of the reinforcing fiber substrate is 55% or more, namely, at a condition where a gap between reinforcing fibers is small, although the fiber volume content of a final molded product itself becomes high, the impregnation property of the resin into the molded product is poor. Therefore, in the case of a thick molded product having a plate thickness of, for example, 25 mm or more, the resin does not reach the corners of the molded product and only a product having a defect due to a resin non-impregnated portion is produced as a structural material.

On the other hand, in the case where the Vf of the reinforcing fibers is, for example, 45% and the gap between reinforcing fibers is relatively great, because the fiber volume content of the final molded product becomes low although a good resin impregnation property can be obtained, only a product having poor strength and lightweight property can be obtained. Namely, the resin impregnation property and the fiber volume content Vf are in a relationship opposite each other and it is difficult to achieve both improvement of the resin impregnation property and increase the fiber volume content together. Moreover, although it is preferred depending on a molded product to control the fiber volume content from the necessity of stabilization of the quality, it is also difficult to satisfy such a requirement.

Further, although usually the reinforcing fiber substrate is formed as a laminate of a plurality of reinforcing fiber materials to obtain an FRP molded product with a predetermined thickness, as to the thickness direction, that is, as to the direction perpendicular to the lamination surface in the reinforcing fiber material laminate, the resistance against the resin flow is generally high and there is a limit in the reaching distance of the resin being impregnated in the thickness direction of the substrate. Therefore, in a case where it is required to increase the number of lamination of the reinforcing fiber materials such as a case of planning to mold a high-strength product, it may be difficult to completely impregnate the resin into the corners of the reinforcing fiber material laminate and, consequently, an FRP structural material having a certain thickness or more substantially cannot be molded.

Accordingly, there is a need to provide a method of RTM molding (method of producing an FRP) which can mold even a thick FRP structural material with a good resin impregnation property, and which can realize improvement of the surface quality, increase of the lightweight property and achievement of an excellent strength.

SUMMARY

We provide a method of RTM molding wherein a reinforcing fiber substrate is placed in a mold, resin distribution media each exhibiting a resin flow resistance lower than a resin flow resistance of the reinforcing fiber substrate are placed on both surfaces of the reinforcing fiber substrate and, after a pressure in the mold is reduced by evacuation, a resin is injected into the mold through the resin distribution media to impregnate the reinforcing fiber substrate with the resin injected, is characterized in that a resin flow resistance of a first resin distribution medium placed on a first surface of the reinforcing fiber substrate is set lower than a resin flow resistance of a second resin distribution medium placed on a second surface of the reinforcing fiber substrate, and the evacuation is carried out through the second resin distribution medium while the resin is injected into the first resin distribution medium to impregnate the reinforcing fiber substrate with the resin injected (a first method) is provided.

Namely, in our method of RTM molding, an intentional large/small relationship is given to the resin flow resistances of the resin distribution media placed on both surfaces of the reinforcing fiber substrate. In practice, the resin flow resistance can be determined by measuring a gas permeation resistance and determining it as a value corresponding to the measured gas permeation resistance. Alternatively, because the permeability generally shown by the following equation has the same meaning as that of the resin flow resistance, such a value may be employed.

$$L=\sqrt{(2\beta PK \times \int [dt/(\mu(t)t)]}$$

L: impregnation distance (m)
K: permeability (m²)
β: constant
P: vacuum pressure in substrate (kg/m²)
μ(t): viscosity (kg·s/m²)
t: expiration time Although the reinforcing fiber substrate may be a single layer or may be formed as a laminate of a plurality of reinforcing fiber materials, because our methods of RTM molding are suitable particularly for molding a thick product, namely, molding to impregnate a resin into a thick reinforcing fiber substrate, our target is mainly where a reinforcing fiber substrate comprising a laminate of a plurality of reinforcing fiber materials is used.

In this method of RTM molding, it is preferred that the resin flow resistance of the above-described second resin distribution medium is set lower than the resin flow resistance of the above-described reinforcing fiber substrate. By this, because the resin flow resistance (gas permeation resistance) of the second resin distribution medium is suppressed sufficiently low as compared with the resin flow resistance (gas permeation resistance) of the reinforcing fiber substrate although the resin flow resistance (gas permeation resistance) of the second resin distribution medium is higher than the resin flow resistance (gas permeation resistance) of the first resin distribution medium, reduction of the vacuum degree in the substrate due to deterioration of gas permeation from the reinforcing fiber substrate is suppressed and damage to the resin impregnation into a thick reinforcing fiber substrate can be avoided.

Further, it is preferred that the resin flow resistance of the above-described first resin distribution medium is set at ⅓ of the resin flow resistance of the reinforcing fiber substrate or less because the resin can be distributed into the medium quickly. Further, more preferably, it is set at ¹/₁₀ or less to distribute the resin more quickly. By this, the distribution property of the resin injected into the first resin distribution medium in the surface direction of the reinforcing fiber substrate is ensured to be sufficiently high, the resin injected into the first resin distribution medium is quickly impregnated in the thickness direction of the reinforcing fiber substrate while the resin is distributed quickly in a direction along the surface. Under such a condition where the resin flow resistance of the first resin distribution medium and the resin flow resistance of the second resin distribution medium are satisfied, the large/small relationship is given to the resin flow resistance of the first resin distribution medium and the resin flow resistance of the second resin distribution medium.

Further, in our methods of RTM molding, it is preferred that a peel ply capable of being removed together with a resin distribution medium after molding is interposed between at least one resin distribution medium and the reinforcing fiber substrate. By this, the resin distribution medium can be easily delaminated. However, after releasing the molded product from the mold, at least one resin distribution medium may be left in the molded product without delaminating it from the molded product. In this case, the peel ply is not necessary for the side where the resin distribution medium is left.

Further, in our methods of RTM molding, a method may be employed wherein a porous sheet is interposed between at least one resin distribution medium and the reinforcing fiber substrate. This porous sheet has a function different from that of the above-described peel ply, and it is a sheet that suppresses transfer of the irregularity of the resin distribution medium to the reinforcing fiber substrate side while maintaining the resin distribution function of the resin distribution medium. Therefore, the sheet is preferably disposed on the design surface side of the molded product.

Further, in our methods of RTM molding, at least one resin distribution medium may be formed by providing a groove as a resin flow path on an inner surface of the mold. In this case, even if a separate resin distribution medium is not made, it is possible to use the inner surface of the mold itself as a resin distribution medium.

Further, in our method of RTM molding, it is preferred that injection of a resin is started also through the second resin distribution medium before the above-described resin reaches the above-described second surface. Namely, from this time, the resin impregnation from both surfaces is substantially started.

Further, in our methods of RTM molding, a method can be employed wherein, in the case where at least two resin injection gates are disposed above the first resin distribution medium, the resin injection is carried out simultaneously from at least two resin injection gates adjacent to each other, or from all resin injection gates. Since evacuation through the second resin distribution medium as well as the resin injection are carried out simultaneously while the quick resin impregnation is achieved, generation of resin non-impregnation portions can be prevented.

Further, our methods of RTM molding from the viewpoint of molding provide a particularly excellent design surface. Namely, our method of RTM molding is characterized in that a reinforcing fiber substrate is placed in a mold, a resin distribution medium exhibiting a resin flow resistance lower than a resin flow resistance of the reinforcing fiber substrate is placed on a surface of the reinforcing fiber substrate opposite the mold, a degasification medium comprising a gas permeation film and a gas permeable substrate is provided between the reinforcing fiber substrate and the mold, a resin is injected into the mold through the resin distribution medium after pressure in the mold is reduced by evacuation and the resin injected is impregnated into the reinforcing fiber substrate by evacuating the resin injected from a degasification space formed between the gas permeation film and the mold (a second method).

In this second method, the above-described reinforcing fiber substrate comprises, for example, a laminate of reinforcing fiber materials.

Further, in the above-described second method, it is preferred that the above-described gas permeation film has a releasability capable of being delaminated from a molded product after molding.

Further, in the above-described second method, particularly in the case where a product with a wide area is molded, it is preferred that at least two resin injection gates are disposed above the resin distribution medium, and resin injection is carried out simultaneously from at least two resin injection gates adjacent to each other, or from all resin injection gates.

Furthermore, in the above-described second method, particularly in a case where a product with a wide area is molded, it is also preferred that at least one evacuation route is provided in the mold in addition to an evacuation route from the degasification space formed between the gas permeation film and the mold.

In the above-described method of RTM molding (the first method), the resin is injected into the first resin distribution medium having a lower resin flow resistance, and the injected resin is quickly impregnated into the reinforcing fiber substrate in the thickness direction while the resin is distributed quickly and broadly in a direction along the first surface of the reinforcing fiber substrate. Then, basically the inside of the mold is reduced in pressure by evacuation via the second resin distribution medium having a higher resin flow resistance, and the above-described injected resin is impregnated into the reinforcing fiber substrate having an evacuated and pressure-reduced condition. At that time, since the resin flow resistance (gas permeation resistance) of the second resin distribution medium is suppressed sufficiently low as compared to the resin flow resistance (gas permeation resistance) of the reinforcing fiber substrate although it is higher than the resin flow resistance (gas permeation resistance) of the first resin distribution medium, it is suppressed to reduce the vacuum degree in the substrate by deterioration of gas permeation from the reinforcing fiber substrate. Quick resin impregnation can thus be ensured.

Therefore, even for a thick reinforcing fiber substrate, a sufficiently good resin impregnation can be ensured. Since the resin flow resistance (gas permeation resistance) of the second resin distribution medium is set higher than that of the first resin distribution medium, the second resin distribution medium can be formed as a medium with a small irregularity as compared to the first resin distribution medium and, even if a transfer of the surface form of this second resin distribution medium to the surface of a molded product occurs, the degree of the irregularity on the surface of the molded product ascribed to the transfer can be suppressed. Therefore, by setting this surface side to be a design surface side, a desirable design surface of the molded product having a small irregularity can be obtained.

In a molding requiring resin impregnation into a further thick reinforcing fiber substrate, in particular, in the case where it is difficult to impregnate the resin sufficiently up to the surface at the second resin distribution medium side of the reinforcing fiber substrate only by the above-described resin impregnation from the first resin distribution medium side into the reinforcing fiber substrate (in the case exceeding the conventional resin impregnation limit), before the resin impregnated from the first resin distribution medium side into the reinforcing fiber substrate reaches the second surface of the reinforcing fiber substrate, the resin injection through the second resin distribution medium can be started. By this resin injection from the second resin distribution medium side, the resin impregnation can be supplemented for a portion in which the resin is hardly impregnated into the reinforcing fiber substrate sufficiently, that is, for a portion of the second surface side, and it becomes possible to impregnate the resin sufficiently over the entire region of the reinforcing fiber substrate in the thickness direction. Namely, in this process, the resin impregnation in the thickness direction of the reinforcing fiber substrate is carried out mainly by impregnation from the first resin distribution medium side, and a lack of impregnation is supplemented by impregnation from the second resin distribution medium side. Further, because a large/small relationship is given between the gas permeation resistances (resin flow resistances) of the first and second resin distribution media, while a quick resin impregnation is carried out from the first resin distribution medium side, in the second resin distribution medium side, the resin impregnation is supplemented, and voids pushed out from the first resin distribution medium side by the impregnated resin are pushed out at a relatively slow speed toward side portions, that is, in a direction along the second surface of the reinforcing fiber substrate, without being enclosed in the reinforcing fiber substrate by the resin impregnated from the second resin distribution medium side. As a result, in spite of resin impregnation from both surface sides, it can be avoided to enclose voids in the reinforcing fiber substrate and, besides, the resin impregnation at the second surface side is supplemented and, therefore, it becomes possible to well mold a thick material without the problem of accompanying void enclosures. Moreover, in this case, by setting the second resin distribution medium side to be a design surface as described above, an excellent design surface with small irregularity can be obtained at the same time. Namely, molding of a thick material and improvement of the surface quality can be both achieved.

Further, the aforementioned method of RTM molding (the second method) is effective for the following cases. Namely, in the case where a flatness of a molded surface (a design surface) at the mold side is further required, and in a molding where a resin impregnation into a thick and broad-area reinforcing fiber substrate is required, in particular, a degasification medium comprising a gas permeation film and a gas permeable substrate can be provided between the reinforcing fiber substrate and the surface of the mold as means for always effectively operating the degasification route from any portion of the mold surface. By this, at the time of resin injection, even if there is a difference in time for the resin to reach the lower surface side (design surface forming side) of the reinforcing fiber substrate and a portion late in impregnation is liable to occur, by evacuation from the degasification formed between the gas permeation film and the mold, finally it becomes possible to completely impregnate the resin over the entire surface. Consequently, a design surface along the mold surface and good in flatness can be obtained.

Further, in the case where the resin is injected simultaneously from at least adjacent resin injection gates or from all resin injection gates, although usually there occur regions in which resin flows overlap and in which evacuation is hard and non-impregnated portions are frequently generated, in the above-described method, because a degasification route is always ensured, finally it becomes possible to completely impregnate the resin over the entire surface.

Further, the gas permeation film, for example, preferably has fine holes on the surface and forms a flat surface. If such a film is employed, together with using a thin and small-irregularity substrate as the above-mentioned gas permeable substrate, the surface quality of a molded product can be improved.

Further, we also provide the following method of RTM molding from the viewpoint of high $V_f$ molding. Namely, the method of RTM molding wherein a reinforcing fiber substrate is placed in a mold, a resin injection line and an evacuation line each communicating with an inside of the mold are provided, pressure in the mold is reduced by evacuation and a resin is injected into the mold and impregnated into the reinforcing fiber substrate to form an FRP molded material, is characterized in that, after the resin is impregnated into the reinforcing fiber substrate to achieve a fiber volume content lower than a target fiber volume content of the FRP molded material, injection of resin is stopped and, thereafter, evacuation of resin is continued until reaching the target fiber volume content (a third method). Namely, when the resin is cured after the resin flows over the entire area of the substrate and impregnated, before the resin is cured, evacuation of resin is continued until reaching the target fiber volume content and excessive resin is evacuated from the inside of the reinforcing fiber substrate, thereby realizing a method of RTM molding capable of increasing the fiber volume content up to the target value.

In this method of RTM molding, a method can be employed wherein, after injection of resin is stopped, at least one line of resin injection lines is changed to an evacuation line, and evacuation of resin is continued until reaching the target fiber volume content.

The above-described target fiber volume content is preferably, for example, in a range of 55 to 65% to achieve a high Vf. In this case, in consideration of decreasing the amount of waste resin to the extent possible and increasing the resin impregnation property, the above-described fiber volume content lower than the target fiber volume content is preferably, for example, in a range of 45 to 60%. Furthermore, in the case where the resin impregnation property is required to be further increased, it is preferably in a range of 45 to 55%.

In this method of RTM molding, the above-described reinforcing fiber substrate can be formed as a preform having a fiber volume content, which is a rate of a volume of reinforcing fibers relative to a bulk volume of the reinforcing fiber substrate, lower than the target fiber volume content. In particular, as the reinforcing fiber substrate, a woven fabric preformed at an arbitrary fiber volume content within a range lower than the target fiber volume content, or a laminate can be used. The laminate may be formed by laminating layers of reinforcing fibers by an arbitrary number and, a structure, where reinforcing fiber layers are bonded to each other, is more preferable because a stability is given to the fiber volume content.

In the above-described method of RTM molding, the determination whether reaching the target fiber volume content or not can be carried out, for example, by measurement of the thickness of the reinforcing fiber substrate, and it may be determined whether an excessive resin is evacuated and removed by a predetermined amount or not by measuring this thickness during the continuation of the resin evacuation.

Further, in the above-described method of RTM molding, it is possible to preset the injection amount of the resin or the evacuation amount. Namely, a method can be employed wherein an injection amount of resin corresponding to the fiber volume content lower than the target fiber volume content is preset, and the injection of resin is stopped at the time reaching the injection amount preset. Further, a method can be employed wherein an evacuation amount to reach the target fiber volume content is preset relative to an injection amount of resin, and the evacuation of resin is stopped at the time reaching the evacuation amount preset.

Further, in the above-described method of RTM molding, it is preferred that at least one layer of the reinforcing fiber substrate comprises a carbon fiber layer to obtain a high-strength and lightweight FRP molded material. This carbon fiber layer can be formed as a woven fabric, for example, a unidirectional woven fabric in which carbon fibers are oriented unidirectionally.

In the above-described method of RTM molding (the third method), because the resin is first impregnated into the reinforcing fiber substrate so that the fiber volume content becomes lower than the target fiber volume content of the FRP molded material, the porosity is high, the resin is impregnated sufficiently over the entire area of the reinforcing fiber substrate and, at that time, generation of resin non-impregnated portions can be prevented. After such resin impregnation, the resin injection is stopped and, thereafter, by the time when the resin is cured, evacuation of resin is continued until reaching the target fiber volume content, and excessive resin is evacuated from the inside of the reinforcing fiber substrate, thereby achieving a target high Vf of the molded material.

Further, we also provide the following method of RTM molding as another method. Namely, the method of RTM molding is characterized in that a plurality of reinforcing fiber materials are laminated in a mold to form a reinforcing fiber material laminate and a resin is impregnated into the reinforcing fiber material laminate by injecting a resin in a direction from an end surface of the reinforcing fiber material laminate along a laminate surface while reducing pressure in the mold by evacuation (a fourth method). Namely, the resin is injected from the end surface of the reinforcing fiber material laminate mainly into a portion between layers of the reinforcing fiber materials and the resin injected is impregnated into respective reinforcing fiber materials.

In this fourth method, the resin is injected from the end surface of the reinforcing fiber material laminate in the direction along the laminate surface, first, the resin is injected quickly into a portion between the layers of the reinforcing fiber materials forming the reinforcing fiber material laminate, which is low in flow resistance and, thereafter, the resin is impregnated from the portion between the layers in the thickness direction of the respective reinforcing fiber materials, namely, in the lamination direction of the reinforcing fiber materials and, therefore, the matrix resin can be quickly injected and impregnated over the entire reinforcing fiber material laminate. Therefore, even if the molded material to be molded has a large thickness, the limit in thickness such as a conventional limit does not exist and the aforementioned problems can be solved. Namely, it is recognized that the resin flow resistance in the direction parallel to the surfaces of the reinforcing fiber materials is about $\frac{1}{5}$-$\frac{1}{10}$ of the resin flow resistance in the direction perpendicular to the surfaces of the reinforcing fiber materials, according to our experiments, although it is different depending on the kinds of the reinforcing fiber material and the resin, and the resin distribution speed in the direction parallel to the surfaces of the reinforcing fiber materials is very fast as compared to that in the perpendicular direction. However, because there exist lower limits in flow resistance of reinforcing fiber material and in resin viscosity and there exists a limit in distance at which the resin can progress between the layers, the molding condition is considered that the distance required for the resin to progress between the layers should be about 600 mm or less. Thus, by impregnating the resin from the end surface of the reinforcing fiber material laminate in the direction along the laminate surface through the portions between layers, the restriction in thickness of the reinforcing fiber material laminate substantially does not exist and the molding can be well carried out up to a thick molded material. Further, because basically it is not necessary to dispose a resin distribution medium in this molding portion, the irregularity of the resin distribution medium is not transferred, the surface property can be improved and a great decrease in cost can be achieved by saving the processes of preparing and removing the resin distribution medium.

Further, in the above-described fourth method, if the gross length of the reinforcing fiber material laminate (in the case where there is a bend or/and a curve, it is a total length along the shape) is 600 mm or less, it is possible to impregnate the resin sufficiently into the respective reinforcing fiber materials by the above-described resin injection from the above-described end surface into the portions between layers. Namely, if this length is more than 600 mm, the resin is hardly impregnated and there is a fear that a resin non-impregnated portion is generated. In the case where the length is 300 mm or less, the resin impregnation becomes possible in a shorter time and such a condition is more preferable.

Further, in the above-described fourth method, if the resin viscosity at a temperature for liquid resin injection is maintained in a range of 10 to 1500 mPa·s during a time from starting resin impregnation to expiration of one hour, a resin impregnation in a short period of time is possible. Namely, if the resin viscosity is less than 10 mPa·s, because the resin viscosity is too low, although the resin is quickly permeated in the portions between layers in the direction along the laminate surface, particularly in a case where the reinforcing fiber material is formed from a strand and the like, because the resin impregnation from the portion around the strand toward the inside of the strand progresses substantially simultaneously, a resin non-impregnated portion is liable to occur in the strand. On the other hand, if the resin viscosity is more than 1500 mPa·s, because the resin viscosity is too high, the distance for resin permeation in the portions between layers in the direction along the laminate surface decreases and the resin is hardly impregnated into the respective reinforcing fiber materials, and a resin non-impregnated portion is liable to occur. Therefore, it is preferred that the resin viscosity at the temperature of liquid resin injection is maintained in a range of 10 to 1500 mPa·s during the time from starting of the resin impregnation to expiration of one hour.

The sectional shape of the reinforcing fiber material laminate is not particularly restricted, and it may be a rectangular, C-type, I-type, L-type, Z-type, T-type, J-type or hat shape, other than a flat plate shape. Further, in the case of a reinforcing panel formed from a skin material (a skin plate material) and a stringer material (a beam material), the skin material is frequently formed in a simple flat plate shape, but the stringer material is frequently formed in a relatively complicated shape, and in such a case, our methods are suitably applied particularly to the part of forming the stringer material. For example, in the case where the reinforcing fiber material laminate comprises a part that forms a stringer material having a section of a rectangular, C-type, I-type, L-type, Z-type, T-type, J-type or hat shape, and a part that forms a skin material, our methods are suitable particularly for molding of this part to form the stringer material. Namely, after the resin is injected from the end surface of the part to form the stringer material of the laminate mainly into portions between layers of the respective reinforcing fiber materials, the resin injected is impregnated into the entire part to form the stringer material. These parts that form the stringer material and parts that form the skin material may be molded integrally. Because the resin is injected from the end surface of the part that forms the stringer material, restriction in thickness of the stringer material does not exist and, because it is not necessary to dispose a resin distribution medium, an improvement of surface property and a decrease in great cost due to saving of the preparing operation and the removing operation of the resin distribution medium, can be achieved. In this case, a method can be employed wherein, for the part that forms the skin material, the resin is impregnated in the thickness direction while being distributed in the direction along the surface of the part that forms the skin material via a resin distribution medium and a reinforcing panel formed from the skin material and the stringer material is molded integrally.

Furthermore, in the above-described fourth method, a method can be employed wherein an upper mold provided with a resin distribution medium or a resin flow path groove is further disposed on the end surface of the reinforcing fiber material laminate.

BRIEF DESCRIPTION OF THE DRAWINGS

FIG. 11 is a schematic vertical sectional view of one example of a molding apparatus used for a method of RTM molding.

EXPLANATION OF SYMBOLS

Figure 1:
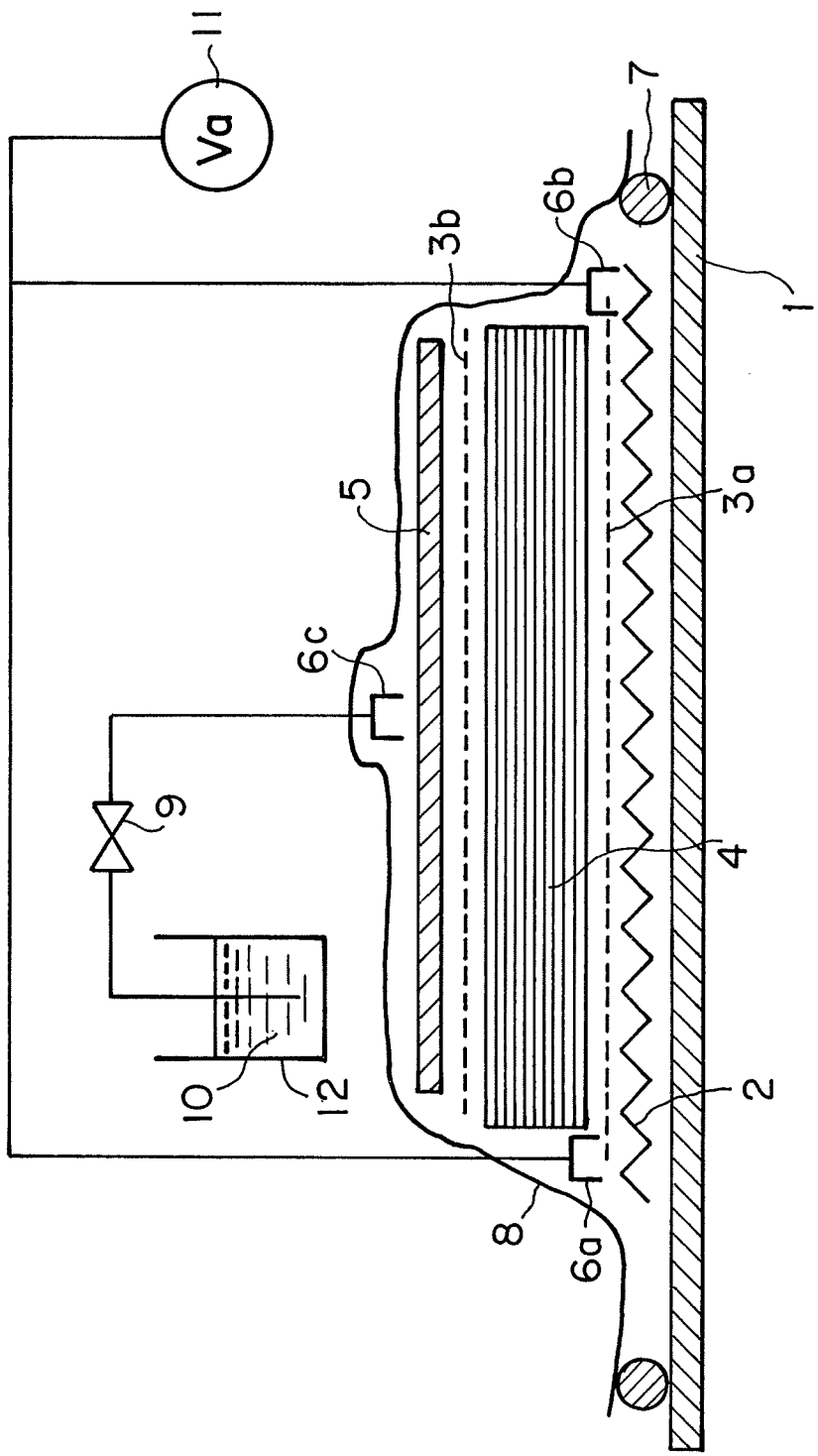
FIG. 1 is a schematic vertical sectional view of one example of a molding apparatus used for a method of RTM molding.

1: mold
2: breather
3, 3a, 3b: peel ply
4: reinforcing fiber substrate
4A, 4B, 4C, 4D: reinforcing fiber material laminate
4a, 4b: end surface of laminate
5, 5a, 5b: resin distribution medium
6, 6a, 6b, 6d, 6e, 6i, 6k, 6l: evacuation gate
6c, 6f, 6g, 6h, 6j, 6m, 6n, 6o: resin injection gate
7: sealant
8: bag material
9, 41, 42, A1, A2, A3, A4, A5, B1, B2: valve
10: matrix resin
11 vacuum pump
12: resin pot
13: vacuum trap
14: shape fixing jig
20: porous sheet
21: dial gauge
23: gas permeable material
30: mold groove for resin distribution
50: gas permeation film
51: gas permeable substrate
52: seal tape
53: degasification port
54: degasification medium

DETAILED DESCRIPTION

Hereinafter, we will explain our methods referring to the drawings.

FIG. 1 is a schematic vertical sectional view of a molding apparatus used for a method of RTM molding. A mold 1 forming a base is made, for example, from a stainless steel or an aluminum alloy, or another metal for mold or an FRP and formed in, for example, a flat-plate like shape. The shape of the mold 1 is processed depending on the shape of a desired molded product and is not particularly restricted.

In this example, a breather 2 is disposed on mold 1 as a second resin distribution medium. The "breather" has a resin flow resistance lower than a flow resistance of a resin flowing in a reinforcing fiber substrate although its resin flow resistance is not low as the flow resistance of the aforementioned conventional resin distribution medium. The surface irregularity (surface roughness) of breather 2 is preferably 1.3 times or less of the surface irregularity (surface roughness) of the reinforcing fiber substrate. As breather 2, concretely, a surface mat, a plain weave woven fabric or a mesh woven fabric comprising glass fibers or carbon fibers which are reinforcing fibers and having a low weight (100 g/m$^2$ or less), or a woven fabric or a knit fabric comprising synthetic fibers and having a large denier (200 denier or more), is preferred.

A peel ply 3a is placed on breather 2. Peel ply 3a is laid to easily remove media and the like from a molded material, and as peel ply 3a, for example, a woven fabric having a releasing function such as a NYLON taffeta is used.

A reinforcing fiber substrate 4 is placed on peel ply 3a. In this example, reinforcing fiber substrate 4 is formed as a laminate of a plurality of reinforcing fiber materials, in particular, a plurality of reinforcing fiber woven fabrics. Our method is suitable particularly for the molding using such a thick reinforcing fiber substrate 4 laminated with a plurality of reinforcing fiber materials. However, even in the case where a reinforcing fiber substrate comprising a single reinforcing fiber material is used, of course, our method can be applied and, also in such a case, our method is suitable particularly for the molding using a thick reinforcing fiber substrate.

A first resin distribution medium 5 is placed on reinforcing fiber substrate 4 via peel ply 3b. First resin distribution medium 5 has an irregularity on the surface and, in this example, the medium has a resin flow resistance of 1/10 or less of the resin flow resistance of reinforcing fiber substrate 4 (reinforcing fiber material laminate). A large/small relationship in resin flow resistance is given between first resin distribution medium 5 and breather 2 as a second resin distribution medium, and the resin flow resistance of breather 2 is set higher than the resin flow resistance of first resin distribution medium 5. As first resin distribution medium 5, concretely, a mesh woven fabric made of polyethylene or polypropylene resin and having a mesh size of #400 or less is preferred. As the result of such a disposition, first resin distribution medium 5 is disposed relative to the first surface of reinforcing fiber substrate 4 and breather 2 as the second resin distribution medium is disposed relative to the second surface at the opposite side.

The whole of the materials thus disposed on mold 1 is covered with a bag material 8. Although bag material 8 comprises a gas-tight material for forming a pressure-reduced cavity, for this bag material 8, in consideration of thermal resistance and the like, for example, a NYLON film is preferably used. A resin injection gate 6c is provided relative to first resin distribution medium 5 in the inside covered with bag material 8, and evacuation gates 6a, 6b to reduce the pressure of the inside by evacuation are provided relative to breather 2 provided as the second resin distribution medium. These gates 6a, 6b, 6c are formed, for example, by using C channel materials made of aluminum and the like, and these channel materials connect to external members via plastic tubes. A sealant 7 made of a synthetic rubber with a high adhesive property is interposed between the edge portion of bag material 8 and mold 1 and, by sealing therebetween, flowing in of air from outside is prevented to maintain a pressure-reduced condition of the inside of bag material 8. A thermoplastic resin 10 prepared as an FRP matrix resin to be impregnated is stored in a resin pot 12 made of a plastic, and by opening a valve 9 at an appropriate timing, the resin is injected via resin injection gate 6c. The inside of the cavity covered with bag material 8 is maintained at a pressure-reduced condition by a vacuum pump 11 via evacuation gates 6a, 6b. By forming bag material 8 as a double bag having a first bag material and a second bag material covering the first bag material, an air leakage can be prevented and, as a result, the fiber volume content (Vf) of reinforcing fibers can be increased.

Further, even if bag material 8 is a single bag, the air leakage can be prevented by disposing sealant 7 at the outer edge portion as a parallel double disposition style and an effect similar to that due to the double bag can be obtained. In this case, the amount used for sub materials and the attachment time can be reduced rather than those in the double bag system and has the merit of performing the molding more inexpensively.

In the molding apparatus shown in FIG. 1, although ply 3b/resin distribution medium 5 are disposed on reinforcing fiber substrate 4 and peel ply 3a/breather 2 are disposed under the reinforcing fiber substrate 4 as in a conventional molding, it may be carried out that, after molding without disposing peel ply 3a, breather 2 is left in the molded material as it is.

The molding in this example is carried out as follows.

Under room temperature or a heated atmosphere, the laminate having a structure shown in FIG. 1 is placed on mold 1 (a tool), and the whole of the materials and members including resin injection gate 6c disposed at the upper side and evacuation gates 6a, 6b disposed at the lower side is covered with bag material 8. In this state, when the resin is injected from resin injection gate 6c while the inside of bag material 8 is reduced in pressure by the evacuation through evacuation gates 6a, 6b, while matrix resin 10 is quickly distributed in first resin distribution medium 5 in a direction along the upper surface of reinforcing fiber substrate 4, the resin flows in a direction from the upper surface toward the lower surface and is impregnated into the reinforcing fiber substrate 4. After resin impregnation is finished, the resin is cured under room temperature or a heated atmosphere and, thereafter, bag material 8 is delaminated and the molded material is released from the mold. Thereafter, peel plies 3a, 3b, resin distribution medium 5 and breather 2 are released and removed from the molded product. However, as one example, breather 2 may be left in the molded product as it is.

In this molding, because the resin flow resistance of first resin distribution medium 5 is set low, the resin injected into the first resin distribution medium 5 is quickly impregnated into reinforcing fiber substrate 4 in the thickness direction while the resin is distributed in the direction along the first surface of the reinforcing fiber substrate 4 quickly and sufficiently broadly. Although the inside of bag material 8 is evacuated via breather 2 provided as the second resin distribution medium to reduce the pressure in the bag material 8, because the resin flow resistance (gas permeation resistance) of breather 2 is sufficiently suppressed compared to the resin flow resistance (gas permeation resistance) of reinforcing fiber substrate 4 although it is higher than the resin flow resistance (gas permeation resistance) of first resin distribution medium 5, the reduction of vacuum degree in the substrate due to the deterioration of gas permeability from the reinforcing fiber substrate can be suppressed and a quick resin impregnation property can be ensured. Therefore, even for a thick reinforcing fiber substrate 4, a sufficiently good resin impregnation property from the side of first resin distribution medium 5 can be ensured. Further, since the resin flow resistance (gas permeation resistance) of breather 2 is set higher than that of first resin distribution medium 5, the breather 2 can be formed as a medium having a small irregularity as compared with the first resin distribution medium 5. Therefore, even if the surface pattern of such a breather 2 is transferred to the surface of a molded product, the degree of irregularity of the surface of the molded product due to the transfer can be suppressed. Namely, while a good resin impregnation property can be ensured, the irregularity of the surface of the molded product at the second resin distribution medium side can be suppressed. By setting this surface side of the molded product having a small irregularity at a design surface side, a molded product having a desirable surface property can be obtained. Namely, it is possible to extinguish the traces of the medium which have been present in the tool surface side of the molded product by curing of the resin in the conventional method.

Figure 2:
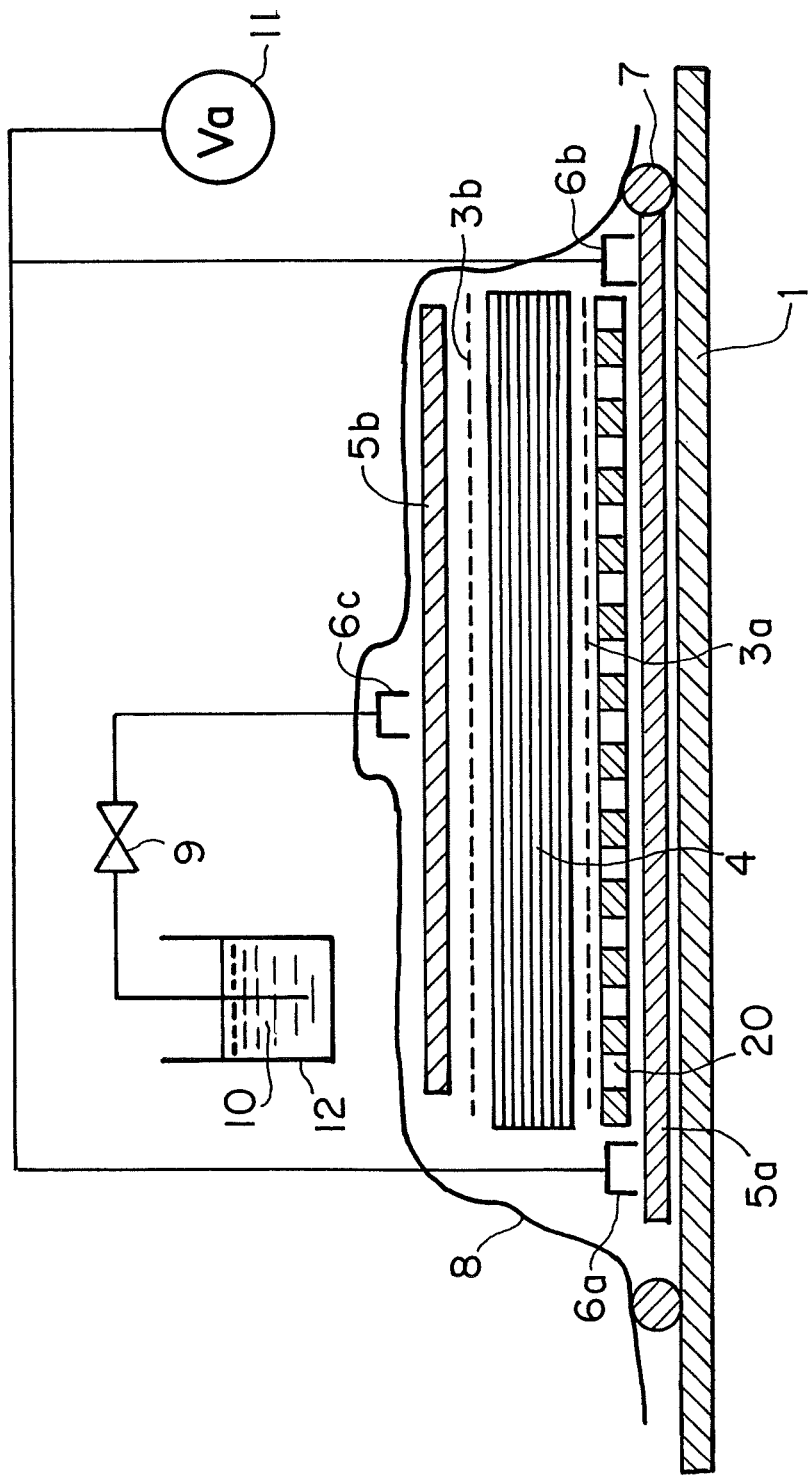
FIG. 2 is a schematic vertical sectional view of one example of a molding apparatus used for a method of RTM molding.
Figure 3:
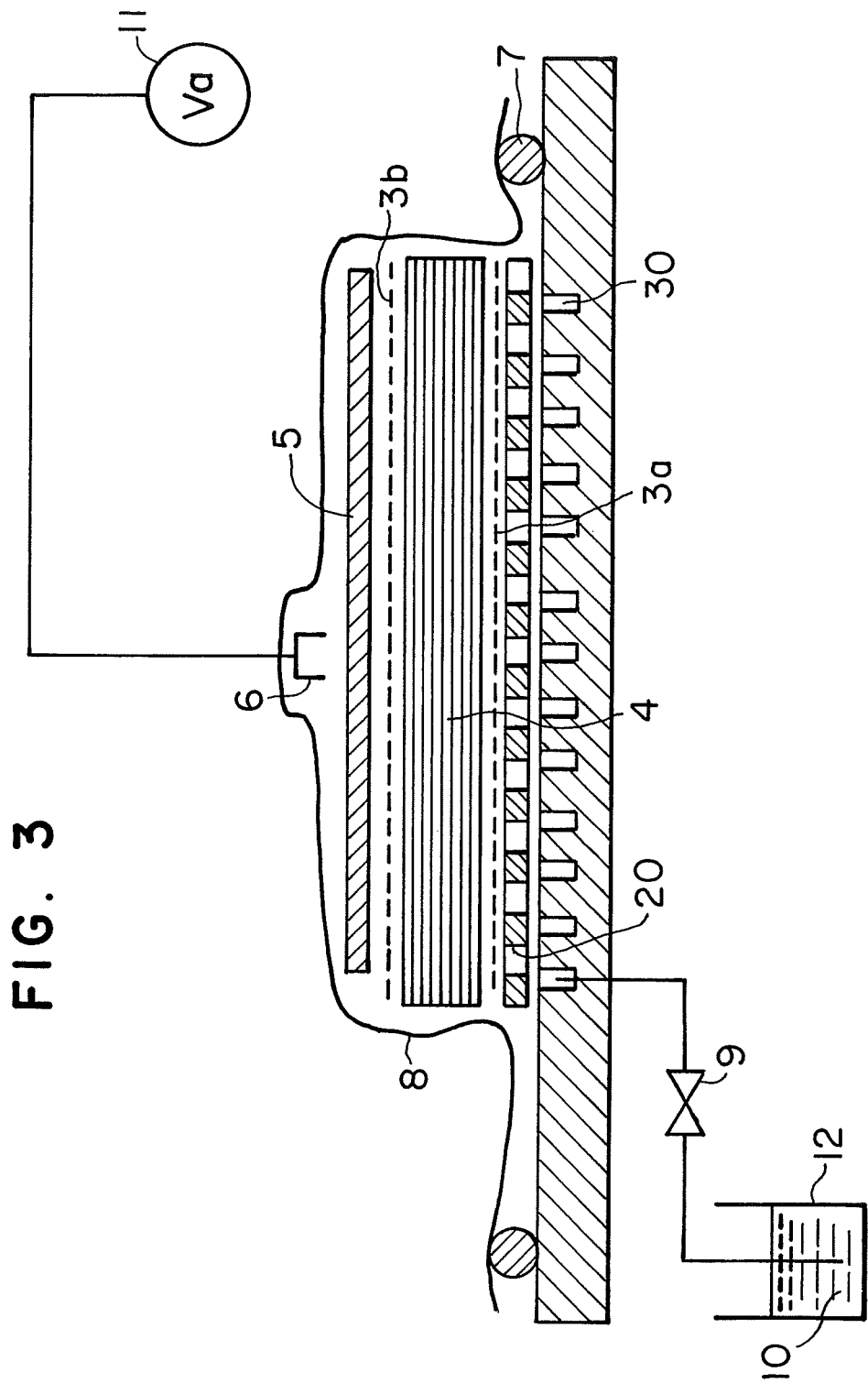
FIG. 3 is a schematic vertical sectional view of one example of a molding apparatus used for a method of RTM molding.

FIG. 2 is a schematic vertical sectional view of a molding apparatus according to a second example of our method, and FIG. 2 shows an example wherein, instead of the breather, a resin distribution medium 5a and a porous sheet 20 are disposed on one surface of the reinforcing fiber substrate. FIG. 3 is a schematic vertical sectional view of a molding apparatus according to a third example of our method, and FIG. 3 shows an example wherein, instead of the resin distribution medium disposed on the surface of the mold in FIG. 2, the surface of the mold itself is formed as a resin distribution medium of the resin injection side by processing grooves on the mold. Hereinafter, only points different from the apparatus shown in FIG. 1 will be explained.

Symbol 20 indicates a porous sheet and, as the material of porous sheet 20, it is preferred to use a metal thin plate material (aluminum or stainless steel material), a steel punching metal with a thickness of 0.1 mm or more, a resin film with a thickness of 0.2 mm or more (a NYLON, polyester, polyethylene, polypropylene or polyimide film), or an FRP sheet with a thickness of 0.2 mm or more. Although the hole is preferred to be circular-type from the viewpoint of processing, the shape is not particularly limited. To almost extinguish the traces of the porous sheet on the surface of a molded material after delaminating the porous sheet 20 from the molded material, the hole diameter is preferably 3 mm or less and more preferably 1.5 mm or less. The arrangement of the holes may be either random or regular. Although a desirable pitch of the holes varies depending on the specification of the reinforcing fiber substrate to be used, it is preferably 15 mm or less, more preferably 10 mm or less. The functions required for porous sheet 20 are as follows. The flatness is required to be equal to the surface roughness required for a final product or more, the stiffness is required to be a stiffness so that the influence of the irregularity of the resin distribution medium is not reflected, and many holes are opened so that the resin can be passed while the above-described stiffness can be maintained. Symbol 30 indicates grooves processed on the mold, and it is preferred that each groove 30 has a width of 0.5 mm to 5 mm and a depth of 1 mm to 6 mm and a pitch of the grooves is in a range of 2 mm to 25 mm, and the sectional shape is formed as a rectangular, reverse trapezoid or triangular shape. More preferably, the sectional shape of the groove is a rectangular shape having a width of about 1 mm and a depth of about 3 mm, and the pitch of the grooves is about 8 mm.

In the molding apparatus shown in FIG. 2, peel ply 3a/porous sheet 20/second resin distribution medium 5a are disposed in this order from the side contacting reinforcing fiber substrate 4 on the lower surface of the reinforcing fiber substrate 4. However, the arrangement of porous sheet 20 and peel ply 3a may be reversed. Further, in the molding apparatus shown in FIG. 2, as another example, as shown in FIG. 3, without using resin distribution medium 5a, grooves for resin injection (example shown in the figure) or for evacuation may be provided on the tool surface (molding surface). In this case, because it becomes possible to perform the resin injection or the evacuation more uniformly over the entire surface rather than the case using the above-described resin distribution medium, a good product with less voids or defects can be obtained easily and stably. On the upper surface of reinforcing fiber substrate 4, peel ply 3b/resin distribution medium 5 as used in the conventional method, or those similar to those disposed at the lower surface side of the reinforcing fiber substrate 4, may be disposed, and thereafter, the molding is carried out in a manner similar to that shown in FIG. 1.

Figure 4:
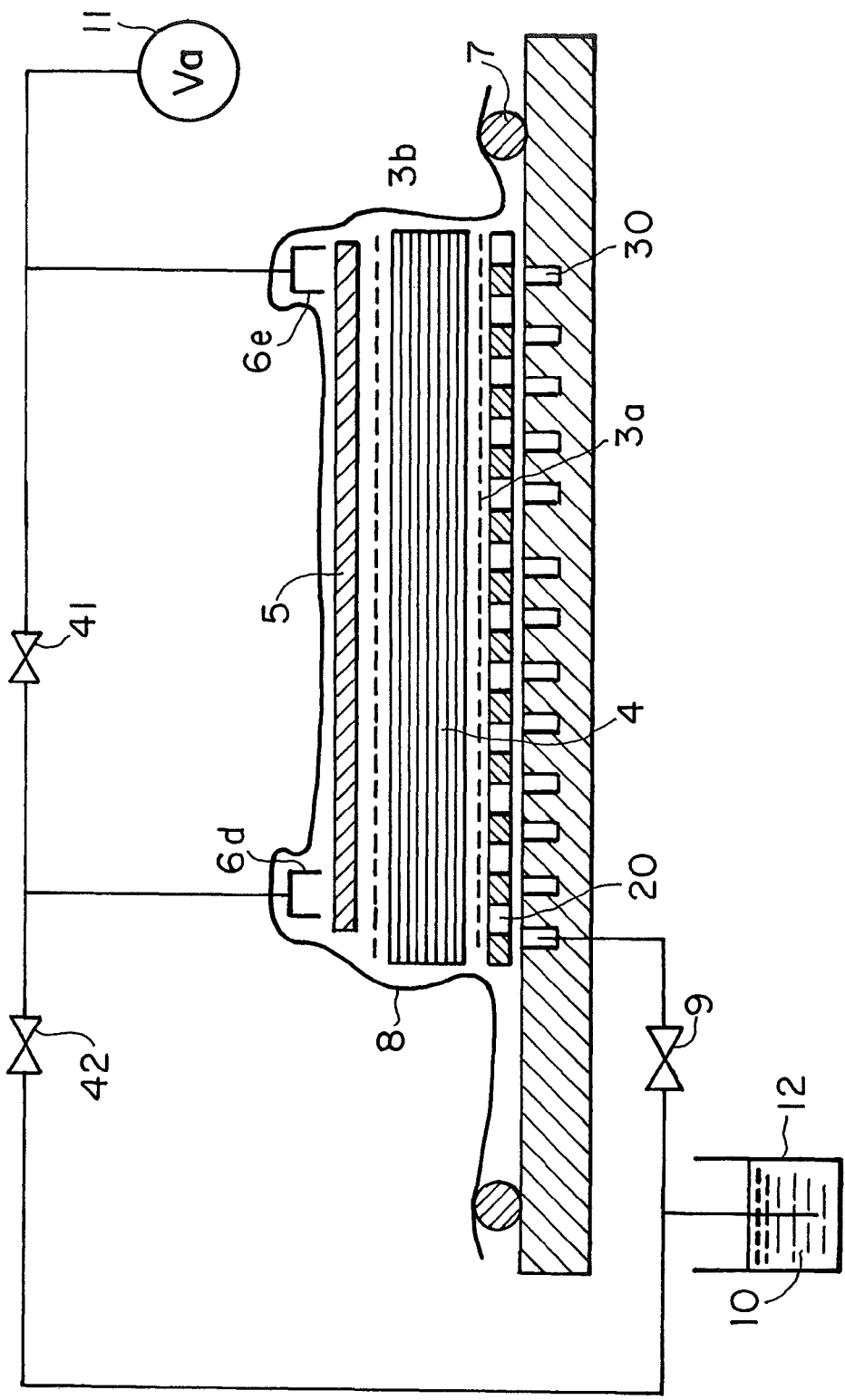
FIG. 4 is a schematic vertical sectional view of one example of a molding apparatus used for a method of RTM molding.

FIG. 4 is a schematic vertical sectional view of a molding apparatus according to a fourth example of our method, and FIG. 4 shows an example wherein two evacuation gates 6d, 6e to reduce the pressure are provided on the reinforcing fiber substrate shown in FIG. 3, and the resin is injected from both sides of the reinforcing fiber substrate by switching one gate 6d to a resin injection port on the way. Hereinafter, only points different from the apparatuses shown in FIGS. 1-3 will be explained.

Evacuation gate 6d is switched to the resin injection port on the way of the molding. When it is used as an evacuation gate, after valve 42 is closed, valve 41 is opened, and when it is switched to a resin injection gate, after valve 41 is closed, valve 42 is opened.

In the molding apparatus shown in FIG. 4, under room temperature or a heated atmosphere, reinforcing fiber substrate 4 is placed on the surface of the mold (tool) processed with grooves 30 via porous sheet 20 and peel ply 3a, and the whole of the materials and members including evacuation gates 6d, 6e disposed in plural on the upper surface side to reduce the pressure and the resin injection gate (grooves 30) disposed on the lower surface side is covered with the bag material. In this state, when valve 41 is opened, valve 42 and valve 9 are closed, while the inside of bag material 8 is evacuated and reduced in pressure by evacuation through the evacuation gate, valve 9 is opened and the resin is injected into grooves 30 provided as the resin injection gate, matrix resin 10 flows and is impregnated from the lower surface to the upper surface of reinforcing fiber substrate 4. In the case where the thickness of reinforcing fiber substrate 4 is 10 mm or more, depending on the combination of the resin and the reinforcing fiber substrate, it is difficult to impregnate the resin completely up to the upper surface. Therefore, when the resin cannot be well impregnated up to the upper surface, before the resin reaches the upper surface of reinforcing fiber substrate 4, valve 41 can be closed and valve 42 can be opened, thereby switching at least one of the evacuation gates at the upper surface side (evacuation gate 6d in FIG. 4) to a resin injection gate. When switched to a resin injection gate, the resin is injected also from the upper surface side, and the above-described lack of the resin impregnation can be supplemented. At the same time, because the resin flows from the side of gate 6d to the side of evacuation gate 6e, voids can be pushed out in the direction toward evacuation gate 6e accompanying with this resin flow. Namely, while a quick resin impregnation is carried out from the side of grooves 30 of the mold provided as the first resin distribution medium, the lack of resin impregnation relative to the upper surface side of thick reinforcing fiber substrate 4 and, at the same time, voids are pushed out toward the side direction and the enclosure of the voids in the reinforcing fiber substrate 4 can be prevented.

As a result, the molding using thick reinforcing fiber substrate 4, in which it has been difficult to sufficiently impregnate the resin because of the existence of a limit thickness for impregnation, becomes possible, and at the same time, by avoiding the enclosure of voids at the time of the molding, it becomes possible to ensure a good quality of the molded product.

After impregnation is finished, although the resin is cured under room temperature or a heated atmosphere, porous sheet 20 having an appropriate stiffness interrupts the influence of the irregularity of the medium itself and a curing drop of the resin stored in the medium which occurs at the time of curing. Therefore, the surface property of the tool surface side of the molded product taken out after delaminating porous sheet 20/peel plies 3a, 3b/resin distribution medium 5 after releasing from the mold is exhibited as a surface property to which the flatness of the tool surface is almost reflected.

Figure 5:
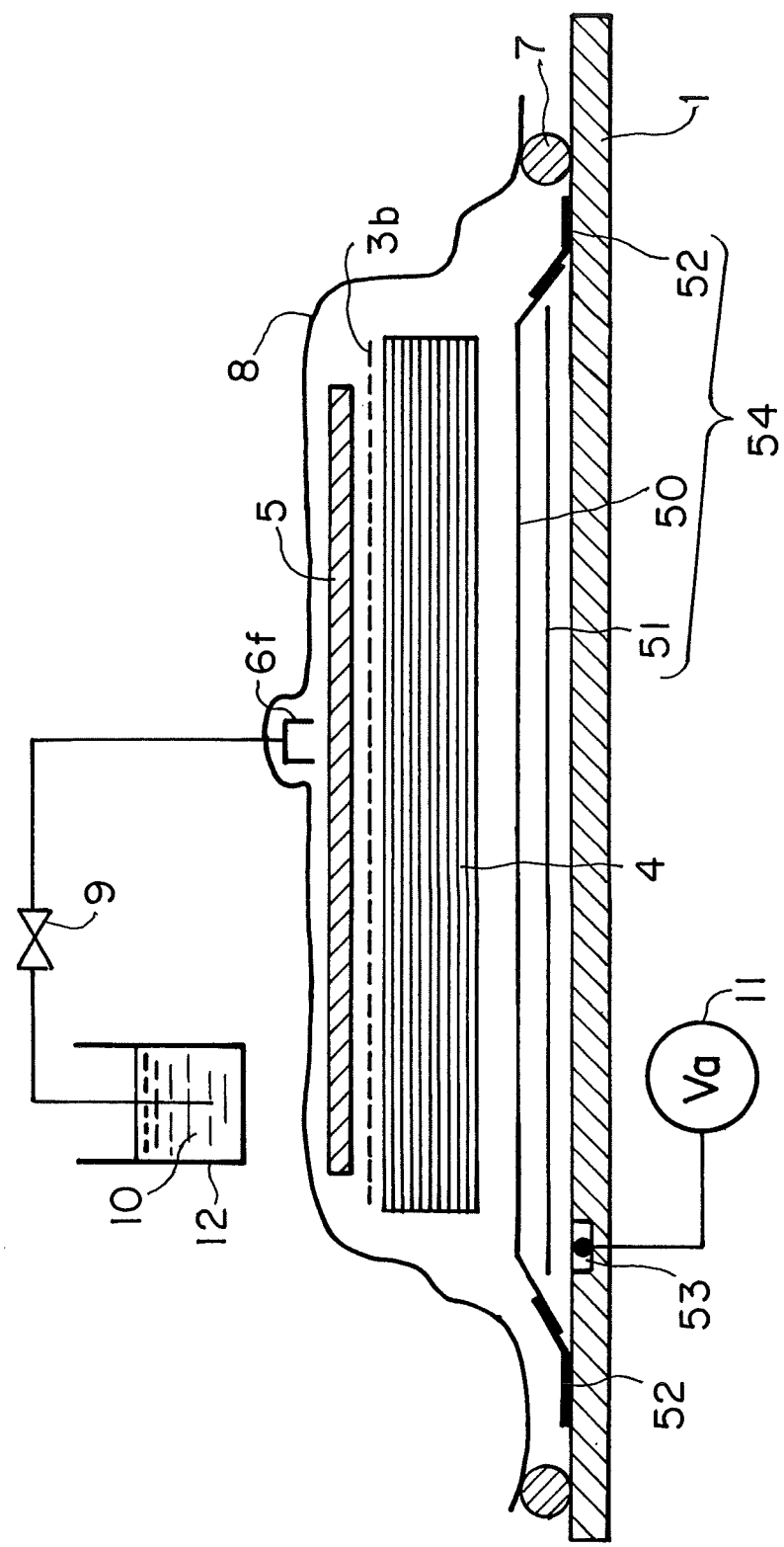
FIG. 5 is a schematic vertical sectional view of one example of a molding apparatus used for a method of RTM molding.

FIG. 5 is a schematic vertical sectional view of a molding apparatus used for a method of RTM molding according to a fifth example of our method and, although the basic portions are the same as those in the aforementioned examples, it is different in that a degasification medium 54 comprising gas permeation film 50, gas permeable substrate 51 and seal tape 52 is provided on mold 1, and evacuation can be carried out from the degasification space formed between the gas permeation film 50 and the mold 1 through degasification port 53. Hereinafter, as to the molding method according to this example, only points different from the aforementioned embodiments will be explained.

First, under room temperature or a heated atmosphere, reinforcing fiber material laminate 4 is placed on the surface of mold 1 (tool), the whole of the materials and members including resin injection gate 6f disposed on the upper side and gas permeation film 50 and gas permeable substrate 51 disposed between mold 1 and laminate 4 is covered with bag material 8. In this case, all of the outer edge of gas permeation film 50 is sealed by adhering it to the mold surface with seal tape 52. In this state, evacuation is carried out by vacuum pump 11, while the inside of bag material 8 is reduced in pressure by evacuation through gas permeation film 50 and the degasification space, the resin is injected from resin injection gate 6f and, whereby matrix resin 10 is distributed quickly in first resin distribution medium 5 in the direction along the upper surface of reinforcing fiber substrate 4 (a plane direction) and flows from the upper surface toward the lower surface of the reinforcing fiber substrate 4 and the resin is impregnated into the reinforcing fiber substrate 4. After impregnation is finished, the resin is cured under room temperature or a heated atmosphere and, thereafter, bag material 8 is delaminated and the molded material is released from the mold.

As gas permeation film 50, any material may be used as long as gas can be permeated but a resin and a liquid cannot be permeated such as a fine porous sheet or resin film or a substrate formed by coating a fine porous membrane onto a paper or fabric. Further, a film having a flatness on its surface can achieve a good surface quality of a molded product. Furthermore, although it is desirable that gas permeation film 50 has a releasing property as the case may be, it is possible to integrate it with a molded product.

Gas permeable substrate 51 preferably has a good gas permeability to increase the impregnation property and preferably has an irregularity as little as possible to improve the flatness of a molded product.

In this method of RTM molding, since, after the pressure in mold 1 is reduced by evacuation, while the resin is injected into the mold 1 through resin distribution medium 5, the injected resin can be impregnated into reinforcing fiber substrate 4 while being evacuated from the degasification space formed between gas permeation film 50 and mold 1, the resin can be quickly and sufficiently broadly on the molding surface at the mold side which becomes a design surface and a design surface having an excellent quality can be molded. Besides, by using a film with fine gas holes and having a high flatness as gas permeation film 50, a design surface having an extremely small irregularity and a high flatness can be molded. Therefore, even for a thick reinforcing fiber material laminate 4, a good resin impregnation can be achieved over the entire laminate and, as described above, a design surface having an extremely small irregularity and a high flatness can be obtained.

Figure 6:
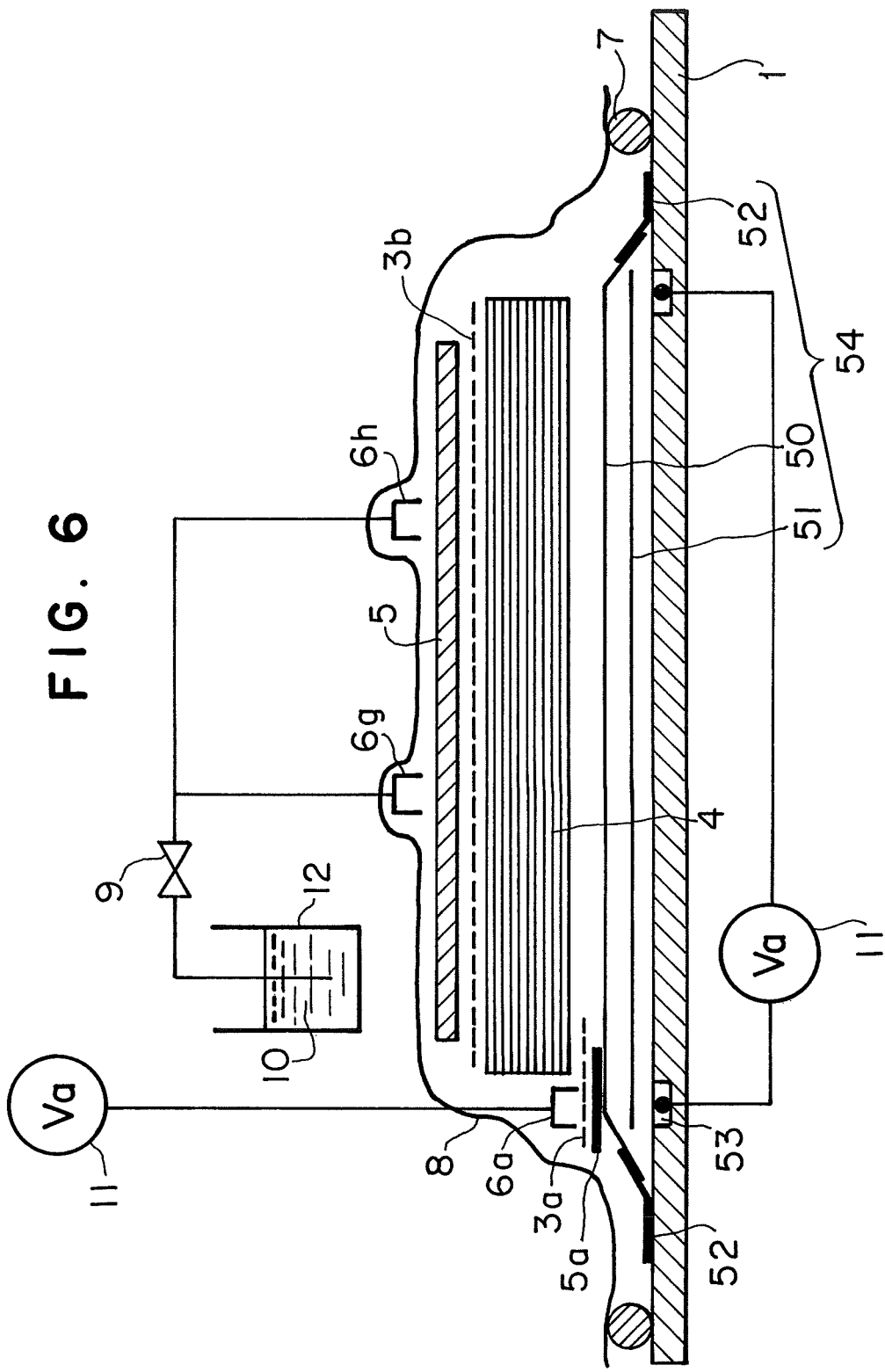
FIG. 6 is a schematic vertical sectional view of one example of a molding apparatus used for a method of RTM molding.

FIG. 6 shows a sixth example. This example is an application example of the fifth example shown in FIG. 5. This method is a method of injecting a resin from at least two adjacent resin injection gates among a plurality of resin injection gates 6g, 6h, and is effective for a large molded product having a wide area. Although laminate 5 is formed in a flat-plate like shape in FIG. 6, even in the case of a molded product having a projection or a variation in thickness or a laminate difficult to control a resin flow such as a curved plate, it becomes possible to distribute a resin over the entire material.

As to the evacuation route (evacuation ports 53) from the degasification space formed between gas permeation film 59 and mold 1, a plurality of those are provided and, even in a large molded product, a sufficient evacuation becomes possible. Further, as needed, evacuation gate 6a (an evacuation route) can be provided in addition to the above-described evacuation route from the degasification space and this can be served to the control of impregnation direction at the time of resin injection or the evacuation of excessive resin after resin impregnation.

Figure 7:
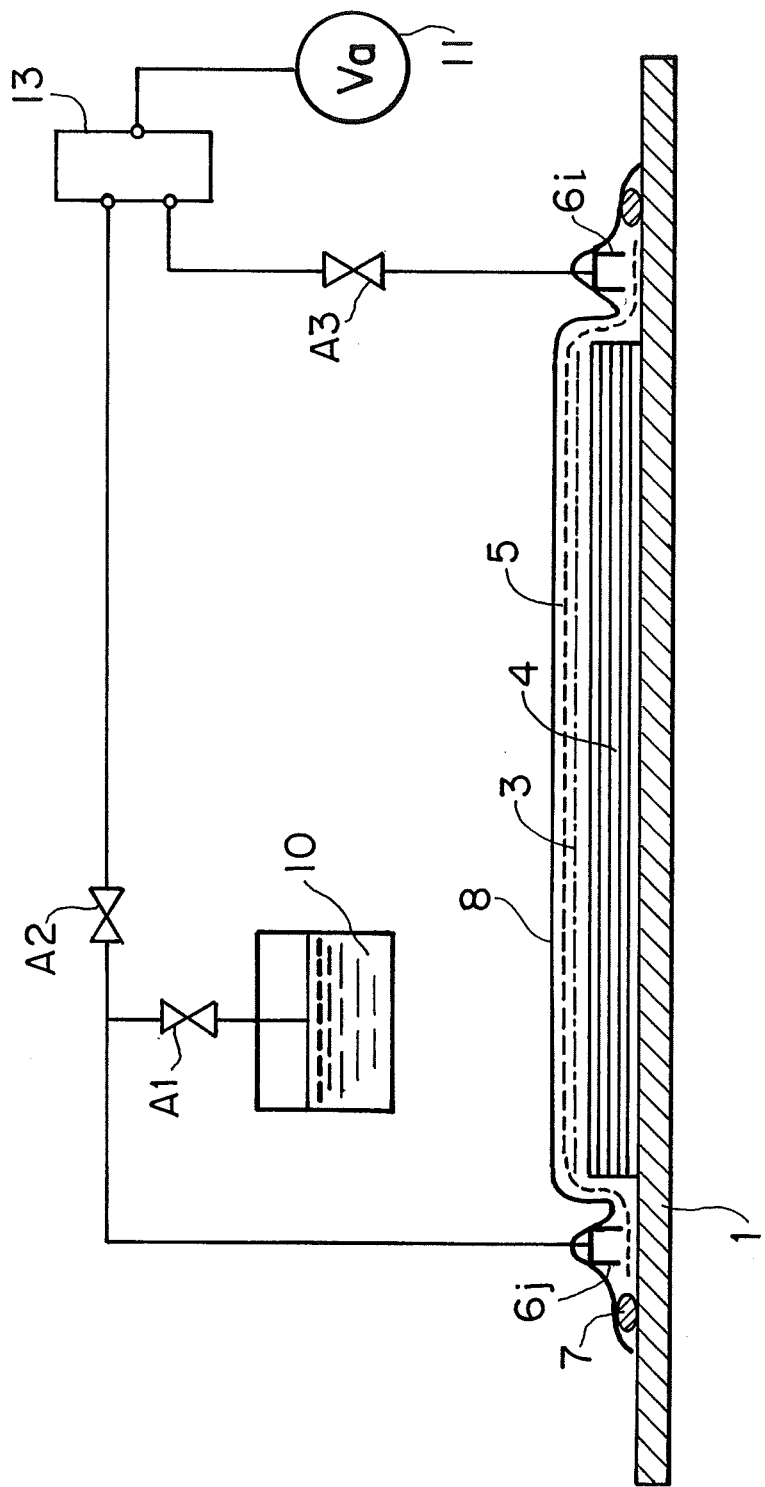
FIG. 7 is a schematic vertical sectional view of one example of a molding apparatus used for a method of RTM molding.

FIG. 7 shows an example of a molding apparatus used for a method of RTM molding according to a seventh example of our method. In FIG. 7, mold 1 forming a base is made, for example, from a stainless steel or an aluminum alloy, or another metal for mold or an FRP, and formed in, for example, a flat-plate like shape. Reinforcing fiber substrate 4 is placed in this mold 1, in the figure, on mold 1. Reinforcing fiber substrate 4 is formed, for example, as a laminate of a plurality of reinforcing fiber woven fabrics. In this example, medium 5 for distributing a resin is placed on reinforcing fiber substrate 4 via peel ply 3. Resin distribution medium 5 preferably has a resin flow resistance of 1/10 or less of the resin flow resistance in reinforcing fiber substrate 4 and, concretely, a mesh woven fabric made of polyethylene or polypropylene resin and having a mesh size of #400 or less is preferred. The whole of the materials thus disposed on mold 1 is covered with bag material 8 comprising a gas-tight material. As bag material 8, in consideration of gas-tight property and thermal resistance, for example, a NYLON film is preferably used. Sealant 7 made of a synthetic rubber with a high adhesive property prevents air from flowing in from outside so that a pressure-reduced condition of the inside of bag material 8 can be maintained. If bag material 8 is formed as a double bag having a first bag material and a second bag material covering the first bag material, an air leakage can be prevented and as a result, the $V_f$ can be increased.

Resin injection port 6j and evacuation port 6i for reducing the pressure in bag material 8 by evacuation are provided in the sealed bag material 8, and the respective ports connect to a resin injection line and an evacuation line. For resin injection port 6j and evacuation port 6i, for example, aluminum C channel materials can be used. These channel materials may connect to external members via plastic tubes forming the resin injection line and the evacuation line. A thermoplastic resin 10 prepared as a matrix resin for an FRP molded material is stored in a resin pot, for example. Vacuum trap 13 accumulates excessive resin evacuated from the molded material through evacuation port 6i. Vacuum pump 11 evacuates from the inside covered with bag material 8 through vacuum trap 13 and evacuation port 6i and maintains a pressure-reduced condition in the inside. Peel ply 3 is interposed to easily remove resin distribution medium 5 from the molded material and, for example, a woven fabric having a releasing function such as a NYLON taffeta is used.

Although the material of the reinforcing fibers forming reinforcing fiber substrate 4 is not particularly restricted, for example, glass fibers, carbon fibers, aramide fibers or the like can be raised. Further, a hybrid structure using or laminating two or more kinds of these fibers may be employed. Further, a sandwich structure interposing a core material such as a foam material or a hollow core between reinforcing fiber layers may be used. As reinforcing fiber substrate 4, it is preferred to use a woven fabric which is preformed at an arbitrary fiber content lower than a target fiber content or a laminate. For example, the woven fabric is preferably formed as a two-dimensional or three-dimensional structure, and the laminate may be a laminate in which an arbitrary number of woven fabrics are laminated, and a preform in which woven fabrics are bonded to each other is more preferred from the viewpoint of stabilization of fiber content.

As resin distribution medium 5, for example, a mesh-like material may be used, and a structure may be also employed wherein a resin flow path is formed on mold 1 by grooves and the like and the surface of the mold 1 formed with the resin flow path itself is formed as a resin distribution medium. Further, it is possible to use the reinforcing fiber substrate itself as a resin distribution medium. As the matrix resin, for example, a polyester resin, a vinylester resin, an epoxy resin, a phenol resin or the like can be raised.

Figure 8:
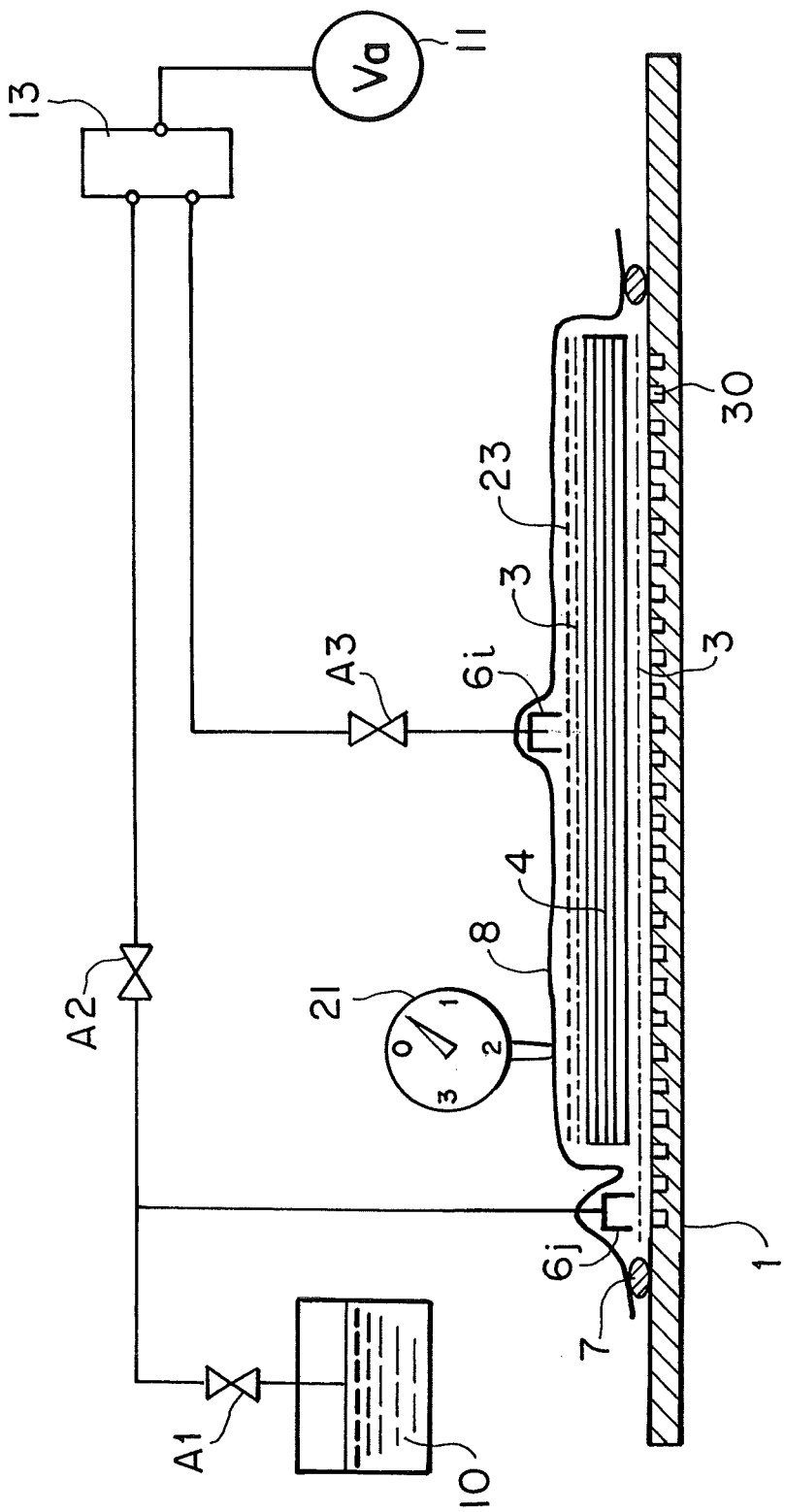
FIG. 8 is a schematic vertical sectional view of one example of a molding apparatus used for a method of RTM molding.

FIG. 8 shows a molding apparatus used for a method of RTM molding according to an eighth example of our method, and shows an apparatus wherein a substantial resin distribution medium is formed on the lower surface side of the reinforcing fiber substrate by processing grooves on the mold instead of disposing a resin distribution medium separately and the thickness (thickness corresponding to the thickness of the molded material or the reinforcing fiber substrate impregnated with the resin) can be measured by a dial gauge during evacuation of resin. Points different from the apparatus shown in FIG. 7 are as follows.

Dial gauge 21 measures the thickness of the reinforcing fiber substrate during evacuation of resin. Grooves 30 are processed on the mold to distribute the resin instead of a resin distribution medium and it is preferred that each groove 30 has a width of 0.5 mm to 5 mm and a depth of 1 mm to 6 mm, the arrangement pitch of the grooves is 2 mm to 25 mm, and the cross-sectional shape of the groove is a reverse trapezoid, a triangle or the like. More preferably, the width is about 1 mm, the depth is about 3 mm, the sectional shape is rectangular, and the pitch is about 8 mm. As a measurement device other than dial gauge 21 that measures the thickness of the molded product, a micrometer or laser measuring device can be raised.

First, reinforcing fiber substrate 4 is placed on the molding surface of mold 1 and, thereon, peel ply 3 for releasing (for example, a NYLON taffeta) and gas permeable material 23 (a polyester nonwoven fabric) are disposed.

As reinforcing fiber substrate 4, it is preferred to use a woven fabric preformed at an arbitrary fiber content lower than a target fiber volume content or a laminate. Because, when a resin is impregnated, it can be controlled at an arbitrary fiber content, and the impregnation is good and can be stabilized.

Further, relative to reinforcing fiber substrate 4, resin injection port 6j and evacuation port 6i are disposed, for example, at the end portion and the central portion (FIG. 8) or at both end portions (FIG. 7), and thereto a resin injection line and an evacuation line are connected, respectively. These resin injection port 6j are the resin injection line and evacuation port 6i and the evacuation line are provided at least one line, respectively. Next, bag material 8 is covered over the whole of the respective members laminated on mold 1 from the upper side, and the portion therearound is sealed by sealant 7 relatively to outside to maintain the inside of reinforcing fiber substrate 4 and the like at a pressure-reduced condition. Then, valves A1, A2 are closed, valve A3 is opened, and the inside evacuated by vacuum pump 11 through evacuation port 6i, a vacuum line and vacuum trap 13, and the inside of the cavity (the inside covered with bag material 8) is reduced in pressure at 0.1 MPa or less.

Next, mold 1 is placed in an oven for heating, and the whole of the mold is heated up to a predetermined temperature. After mold 1 is heated up to the predetermined temperature, valve A1 is opened, and resin 10 injected into the cavity through resin injection port 6j. The resin is distributed in gas permeable material 23 toward the evacuation line, and the resin in the gas permeable material 23 is started to be impregnated into reinforcing fiber substrate 4. Then, when the resin is impregnated over the entire area in the substrate 4 or when a predetermined amount of resin is injected even if the resin is not impregnated over the entire area in the substrate 4, valve A1 is closed and the supply of resin stopped. It is desirable that the fiber volume content $V_f$ at the time of this stopping of resin injection is set in a range of 45% to 60%, more preferably, in a range of 50% to 55%. This is due to suppressing resin loss due to evacuation as little as possible. Then, resin evacuation to resin trap 13 is carried out through evacuation port 6i communicated the vacuum line and resin injection port 6j after valve A2 is opened until reaching the predetermined fiber volume content. Although the resin evacuation may be continued until the resin becomes gel or the resin is cured, the evacuation is carried out until finally reaching the target fiber volume content of 55% to 65%. To set the target fiber volume content in such a range is because, for example, in the case of members for airplanes, it is necessary to set the $V_f$ at 55% or more from the comparison in cost and performance with metal materials and, further, if the fiber volume content becomes a high $V_f$ more than 65%, problems are liable to occur such as void generation by bad impregnation, reduction in shear strength between layers in the molded material, etc.

Our target fiber volume content $V_f$ can be set, for example, by the following method.

Namely, it is possible to estimate the fiber volume content of the molded material from the thickness of the reinforcing fiber substrate by the following equation.

$$V_f = FAW \times PLY/(\rho \times t)$$

$V_f$: fiber volume content (%)
FAW: weight of reinforcing fiber material forming the reinforcing fiber substrate (g/cm$^2$)
PLY: lamination number of reinforcing fiber materials
ρ: density of reinforcing fiber substrate (g/cm$^3$)
t: thickness (cm)

A method may be employed wherein a device that measures the thickness of the laminate (reinforcing fiber substrate) is disposed beforehand, and when the thickness reaches a thickness corresponding to the target fiber volume content while the thickness of the laminate is measured, valves A2 and A3 are closed. Alternatively, because the fiber volume content can be defined by the amounts of fibers and resin in the laminate, a method can be also employed wherein the amount of resin injection and the amount of evacuation corresponding to the predetermined fiber volume content is preset, the resin injection is stopped at the time reaching the target injection amount, and at the stage reaching the target evacuation amount, the resin evacuation is stopped.

Thereafter, the resin is cured at a predetermined temperature and period of time. After curing is finished, all the submembers including the gas permeable material and members used for the resin injection and evacuation lines together with the bag material and the peel ply are removed and, finally, a molded product is released from the surface of the mold. The molded material obtained is served to an aftercuring at predetermined temperature and period of time, as needed.

Figure 9:
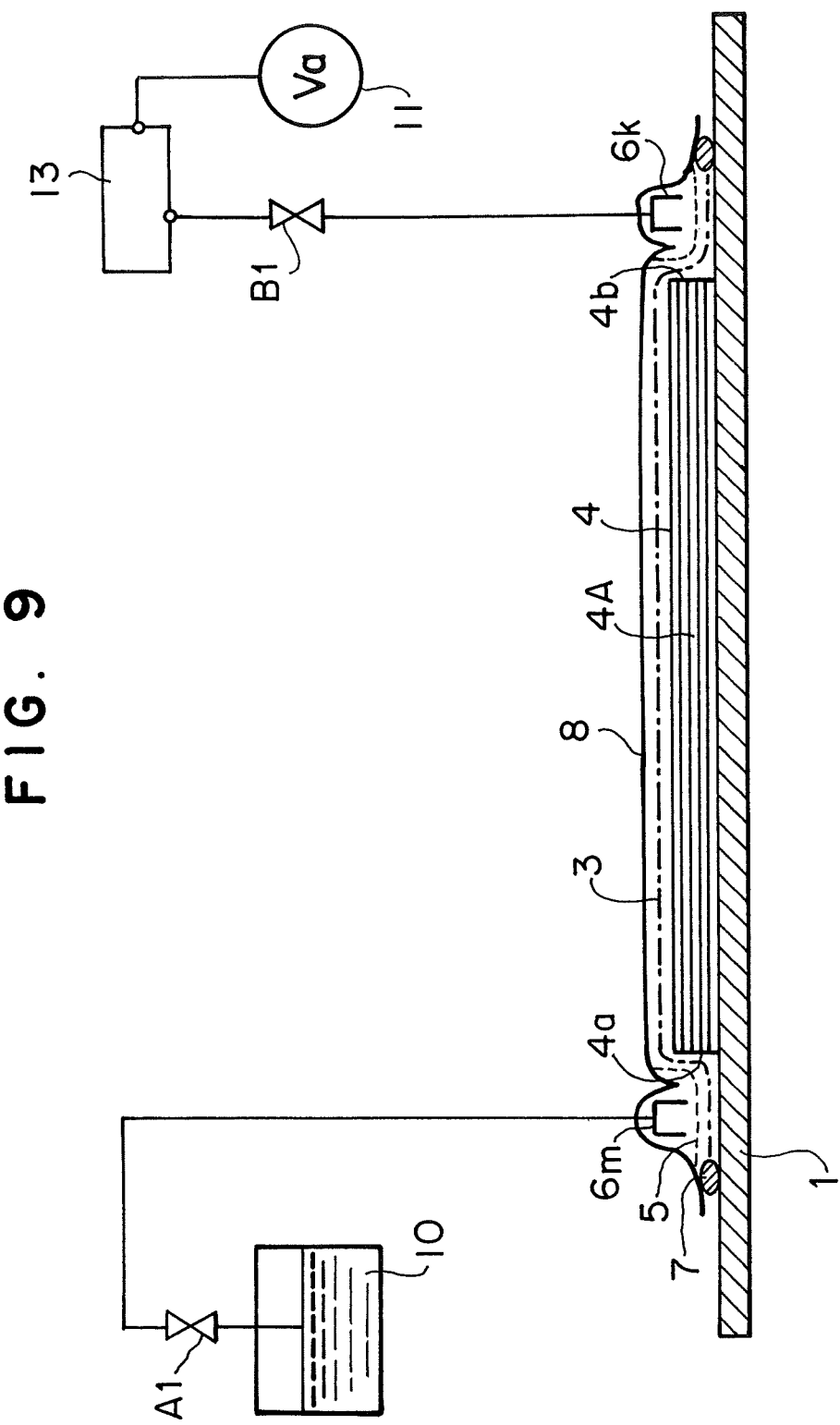
FIG. 9 is a schematic vertical sectional view of one example of a molding apparatus used for a method of RTM molding.

FIG. 9 shows an example of a molding apparatus used for a method of RTM molding according to a ninth example of our method. In FIG. 9, mold 1 forming a base is made, for example, from a stainless steel or an aluminum alloy or another metal for mold or an FRP and formed in, for example, a flat-plate like shape. Where mold 1 is thus formed as a flat-plate like mold, although a concave-type cavity is not necessary, depending on the shape of a molded product to be molded, a concave-type cavity is formed in mold 1. Reinforcing fiber material laminate 4A is placed in this mold 1, in the figure, on mold 1. Reinforcing fiber material laminate 4A is formed as a laminate of a plurality of reinforcing fiber materials 4 and each reinforcing fiber material 4 comprises, for example, a reinforcing fiber woven fabric. Symbols 4a, 4b indicate the respective end surfaces of reinforcing fiber material laminate 4A formed in a thick flat plate-like shape. Relative to these end surfaces 4a, 4b, resin distribution medium 5 for distributing a resin is disposed via peel ply 3. Peel ply 3 is disposed to cover the whole of reinforcing fiber material laminate 4A. This resin distribution medium 5 preferably has a low resin flow resistance of ¹/₁₀ or less of the resin flow resistance in reinforcing fiber material laminate 4A and, concretely, a mesh woven fabric made of polyethylene or polypropylene resin and having a mesh size of #400 or less is preferred. The whole of the materials thus disposed on mold 1 is covered with bag material 8 comprising a gas-tight material. As bag material 8, in consideration of gas-tight property and thermal resistance, for example, a NYLON film is preferably used. Sealant 7 made of a synthetic rubber with a high adhesive property prevents the flowing in of air from outside so that a pressure-reduced condition of the inside of bag material 8 can be maintained. Peel ply 3 is laid to easily remove resin distribution medium 5 and the like from a molded material, and as peel ply 3, for example, a woven fabric having a releasing function such as a NYLON taffeta can be used.

Resin injection port 6m and evacuation port 6k that reduces pressure in bag material 8 by evacuation are provided in the sealed bag material 8 and the respective ports are connected to a resin injection line and an evacuation line. For resin injection port 6m and evacuation port 6k, for example, aluminum C channel materials can be used, and these channel materials may connect to external members via plastic tubes forming the resin injection line and the evacuation line. A thermoplastic resin 10 prepared as a matrix resin for an FRP molded material is stored in a plastic pot, for example. Vacuum trap 13 accumulates an excessive resin evacuated from the molded material through evacuation port 6k. Vacuum pump 11 evacuates from the inside covered with bag material 8 through vacuum trap 13 and evacuation port 6k, and maintains a pressure-reduced condition in the inside. Valves A1, B1 are provided for opening/closing the tubes of the resin injection line and the evacuation line, and for these, for example, joints with valves or pinch-off pliers can be used. By forming bag material 8 in a double-bag system having a first bag material and a second bag material covering the first bag material, an air leakage can be prevented and, as a result, the volume content of the reinforcing fibers (Vf) can be increased.

Figure 10:
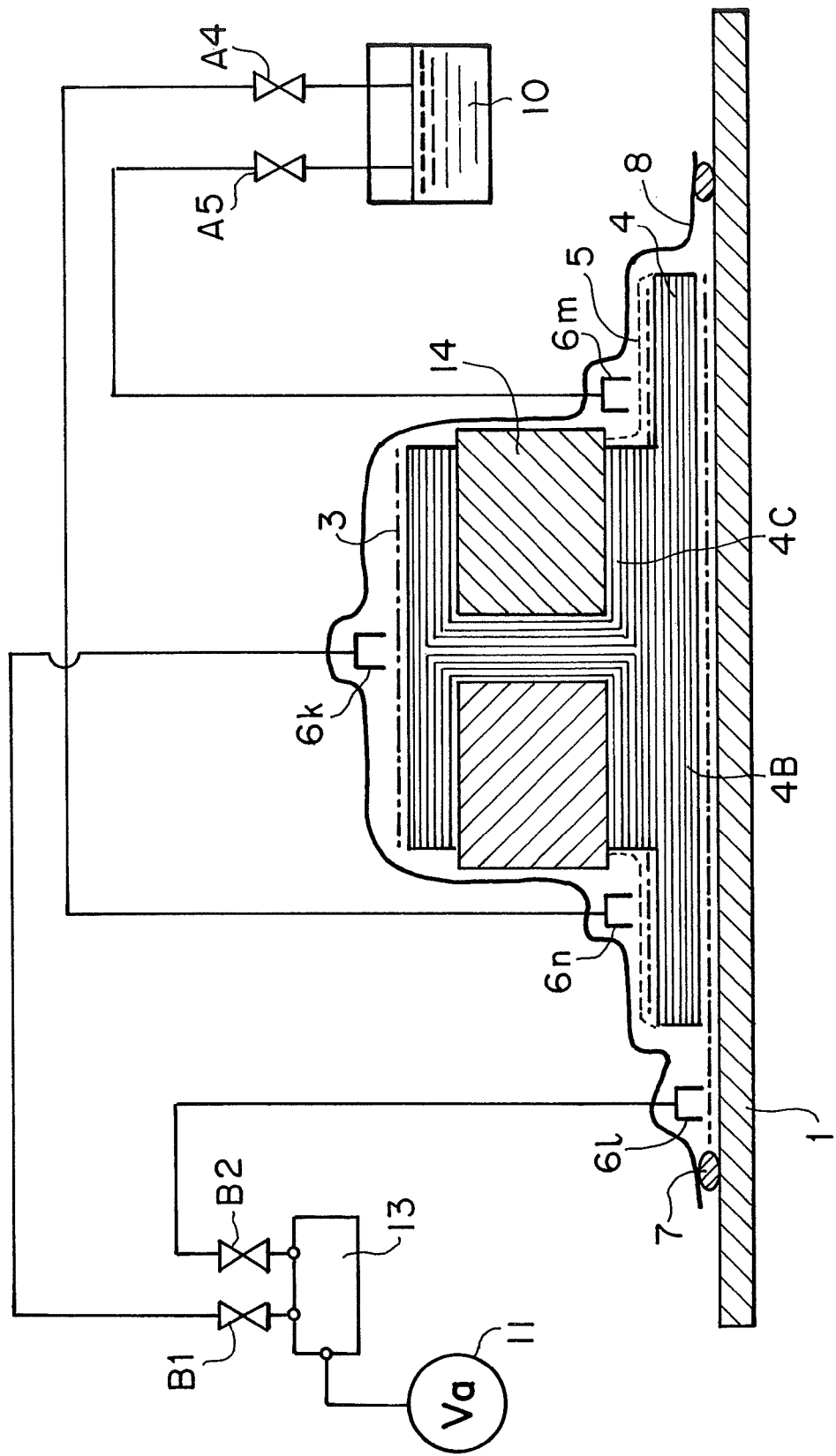
FIG. 10 is a schematic vertical sectional view of one example of a molding apparatus used for a method of RTM molding.

FIG. 10 shows a molding apparatus used for a method of RTM molding according to a tenth example of our method, and shows an apparatus for molding a molded material with an integral composite formation comprising a stringer material with a composite shape, particularly with an I-type cross section, and a flat plate-like skin material, as a fiber reinforced resin molded material with a so-called "skin/stringer" integral structure. Point different from the apparatus shown in FIG. 9 are as follows.

A laminate 4B (reinforcing fiber material laminate) of reinforcing fiber woven fabrics having a flat-plate like cross section forms a part that forms a skin material, and a laminate 4C (reinforcing fiber material laminate) of reinforcing fiber woven fabrics having an I-type cross section forms a part that forms a stringer material. Evacuation port 6l that reduces pressure and resin injection port 6n that injects resin are provided, and C channel materials made of aluminum are preferably used for these ports. The channel materials connect to external members via plastic tubes. Jigs 14 are provided to fix reinforcing fiber material laminate 4C forming the part that forms the stringer material at a C-type shape from both sides, respectively, and for the jigs 14, for example, metals or foamed cores can be used. A5, A4 are valves for opening/closing the tubes and, for these valves, for example, joints with valves or pinch-off pliers can be used. The injected resin flows in resin distribution medium 5 disposed over the exposed upper surface portion of part that forms the skin material 4B and the lower end surface portions of the reinforcing fiber material laminate of part that forms the stringer material 4C with an I-type cross section, and the resin is impregnated mainly in the thickness direction relatively to the part that forms the skin material 4B, and impregnated in the direction toward the portions between layers (a direction along the surface of the laminate of the reinforcing fiber materials) from the end surfaces of the reinforcing fiber material laminate relatively to the part that forms the stringer material 4C.

FIG. 11 shows a molding apparatus used for a method of RTM molding according to an eleventh example of our method, and shows an apparatus for molding a reinforcing fiber material laminate having a step. 4D is a reinforcing fiber material laminate disposed partially on the upper surface of the laminate of reinforcing fiber materials 4 similar to those shown in FIG. 9. The injected resin flows in resin distribution medium 5 disposed to extend up to one end surface of reinforcing fiber material laminate 4D and the resin is permeated in the lamination direction (thickness direction) relative to the thin plate portion (a portion where the laminate 4D is not laminated) and impregnated in the direction parallel to the lamination direction (namely, the direction toward the portions between layers) from the end surface of the reinforcing fiber material laminate 4D via the resin distribution medium 5 disposed on the surface perpendicular to the lamination direction relative to the thick plate portion (a portion where the laminate 4D is laminated).

Next, our methods are carried out as follows, using the above-described respective apparatuses. The methods will be explained with respect to the apparatus shown in FIG. 9, which shows a basic example. First, a plurality of reinforcing fiber materials 4 are laminated on the molding surface of mold 1 to form reinforcing fiber material laminate 4A and, thereon, peel ply 3 for releasing (for example, NYLON taffeta) is disposed to cover the whole of the laminate 4A. In this case, the outer edge of peel ply 3 is disposed to reach up to sealant 7 as shown in FIG. 9. Next, resin distribution medium 5 is disposed near both end portions of reinforcing fiber material laminate 4A to extend up to both end surfaces 4a, 4b of the laminate 4A and, further, thereon, resin injection port 6m and evacuation port 6k are disposed, respectively. Then, the whole of these materials is covered with bag material 8 (bag film) and the portion between the edge portion and mold 1 is sealed by sealant 7 over the entire circumference.

Because the preparation for molding is completed by the above-described operations, valve A1 is closed and vacuum pump 11 operates. Next, valve B1 is opened and the inside of the cavity (the inside of bag material b) is evacuated from evacuation port 6k through vacuum trap 13. Next, the whole of the members on mold 1 is heated to a predetermined molding temperature. When the temperature of mold 1 is increased to the predetermined molding temperature, valve A4 is opened and matrix resin 10 injected through resin injection port 6m by the reduced pressure in bag material 8. After the resin 10 is distributed through one resin distribution medium 5, first, the resin flows quickly in the portions between layers of reinforcing fiber material laminate 4A having a low flow resistance and the resin reaches the opposite end portion of the laminate 4A. When the flow resistances of the respective portions between layers become at a balanced condition, then, the resin is impregnated in the thickness direction of the respective reinforcing fiber materials 4 from the respective portions between layers, namely in the lamination direction of reinforcing fiber materials 4, and at the time when the flow resistance reaches a balanced condition, the resin is impregnated uniformly over the entire area of the reinforcing fiber material laminate 4A. At the time confirming that the predetermined amount of resin has been injected, the supply of the resin is stopped by closing valve A1. Thereafter, the resin is cured at predetermined temperature and period of time. After finishing the curing, all the sub members including the resin distribution medium and the members used for resin injection and evacuation ports together with the bag material and the peel ply (releasing woven fabric) are removed from the surface of the molded material and, finally, the molded material is released from the surface of the mold. The molded material obtained is sent for aftercuring at a predetermined temperature and period of time, as needed.

EXAMPLES

Hereinafter, we will explain our methods based on examples.

Example 1

In the molding apparatus for RTM shown in FIG. 1, breather 2 (glass fiber surface mat, weight: 80 g/m$^2$) was placed on the molding surface of mold 1, evacuation gates 6a, 6b were disposed at both end portions, and vacuum pump was connected. Peel ply 3a was disposed on breather 2 and, thereon, reinforcing fiber substrate 4 comprising carbon fiber woven fabrics (produced by Toray Industries, Inc., plain weave fabric CO6343 using carbon fibers T300, weight: 200 g/m$^2$) laminated by 120 plies was disposed. At that time, although peel ply 3a between breather 2 and reinforcing fiber substrate 4 may be omitted, this structure is allowed on the premise that the breather is left in a product after molding and, in such a case, a carbon fiber mesh woven fabric is desirable as the breather.

Peel ply 3b was disposed on reinforcing fiber substrate 4, thereon resin distribution medium 5 of a polypropylene mesh material (produced by Tokyo Polymer Corporation, "Netron"TSX-400P) was disposed and, thereon, resin injection gate 6c was disposed and connected to resin pot 12 via valve 9. The whole of these members was covered with bag material 8 (bag sheet), and the circumferential portion sealed by sealant 7 (although omitted in the figure, a double-bag system was employed). Valve 9 was closed, the inside of the cavity covered with bag material 8 was evacuated and reduced in pressure by vacuum pump 11. The whole was heated at 60° C. in an oven and that state was maintained for one hour. When thermoplastic epoxy matrix resin 10 (the resin viscosity at 60° C. (injection temperature): 200 mPa·s, the resin viscosity after expiration of one hour at 60° C.: 300 mPa·s) was stored in resin pot 12 and valve 9 was opened, while the matrix resin 10 was distributed into the medium 5 through the resin injection line, the resin was impregnated in the thickness direction from the upper side toward the lower side, the substrate with a thickness of about 25 mm was completely impregnated with the resin without generating a non-impregnated portion. After resin impregnation, about 50 minutes after, valve 9 was closed to stop the supply of the resin, the whole was heated up to 130° C. at about 2/min., and that state was held for 2 hours, the matrix resin was cured. Thereafter, the temperature was lowered to room temperature at about 2° C./min. and the whole was taken out from the mold and the bag material 8 removed. By delaminating the peel ply from the cured material, the cured resin on the surface of the molded product, the medium and the breather were removed. A surface good in surface flatness was obtained for the surface having contacted with the breather, although an irregularity was observed on the surface having contacted with the medium.

Example 2

In the molding apparatus for RTM shown in FIG. 2, on the molding surface of mold 1, medium 5a of a polypropylene mesh material (produced by Tokyo Polymer Corporation, "Netron"TSX-400P) was disposed, and on the circumferential portion thereof, evacuation gates 6a, 6b were placed and connected to vacuum pump 11. Porous sheet 20 (stainless steel punching metal with a thickness of 0.2 mm, in which holes each having a diameter of 1 mm were processed at a pitch of 10 mm) was disposed on the medium 5a. Thereon, peel ply 3a was disposed and, thereon, reinforcing fiber substrate 4 comprising carbon fiber woven fabrics (produced by Toray Industries, Inc., plain weave fabric CO6343 using carbon fibers T300, weight: 200 g/m$^2$) laminated by 120 plies was disposed.

Peel ply 3b was disposed on reinforcing fiber substrate 4. Thereon, medium 5b was disposed and, thereon, resin injection port 6c was disposed and connected to resin pot 12 via valve 9 as a resin injection gate. At that time, a porous sheet may be disposed between peel ply 3b and medium 5b. The whole of these members was covered with bag material 8 by a double bag system and the circumferential portion sealed by sealant 7. Valve 9 was closed, the inside of the cavity covered with bag material 8 was reduced in pressure by vacuum pump 11, and the whole heated at 60° C. in an oven. That state was maintained for one hour. When thermoplastic epoxy matrix resin 10 (the resin viscosity at 60° C. (injection temperature): 200 mPa·s, the resin viscosity after expiration of one hour at 60° C.: 300 mPa·s) was stored in resin pot 12 and valve 9 opened, while the matrix resin 10 was distributed into the upper medium 5b through the resin injection line, the resin was impregnated in the thickness direction of carbon fiber woven fabric laminate 4 from the upper side toward the lower side, and the reinforcing fiber material laminate 4 with a thickness of about 25 mm was completely impregnated with the resin without generating a non-impregnated portion. After resin impregnation, valve 9 was closed to stop the supply of resin, the whole was heated up to 130° C. at about 2/min., and that state was held for 2 hours. The matrix resin was cured and, thereafter, the temperature was lowered to room temperature at about 2° C./min., and the whole was taken out from the mold and the bag material 8 was removed. As a result of removing the peel ply from the cured material and removing the cured resin, the medium and the porous sheet, a surface good in surface flatness was obtained for the surface having contacted with the porous sheet, although an irregularity was observed on the surface having contacted with the medium.

Example 3

In the molding apparatus for RTM shown in FIG. 3, using the mold processed with #-type grooves 30 for resin distribution (a groove having a rectangular cross section with a width of 1 mm and a depth 3 mm and the pitch of the grooves is 8 mm), resin pot 12 was connected to the grooves via valve 9. Porous sheet 20 (stainless steel punching metal with a thickness of 0.2 mm, in which holes each having a diameter of 1 mm were processed at a pitch of 10 mm) was disposed on the molding surface. Thereon, peel ply 3a was disposed, and thereon, reinforcing fiber substrate 4 comprising carbon fiber woven fabrics (produced by Toray Industries, Inc., plain weave fabric CO6343 using carbon fibers T300, weight: 200 g/m$^2$) laminated by 120 plies was disposed. Peel ply 3b was disposed on reinforcing fiber substrate 4. Thereon, medium 5 of a polypropylene mesh material (produced by Tokyo Polymer Corporation, "Netron"TSX-400P) was disposed and, thereon, evacuation gate 6 was placed and connected to vacuum pump 11. The whole of those members were covered with bag material 8 by a double bag system and the circumferential portion was sealed by sealant 7. Valve 9 was closed, the inside of the cavity covered with bag material 8 reduced in pressure by vacuum pump 11, and the whole was heated at 60° C. in an oven and the state was maintained for one hour. When thermoplastic epoxy matrix resin 10 (the resin viscosity at 60° C. (injection temperature): 200 mPa·s, the resin viscosity after expiration of one hour at 60° C.: 300 mPa·s) was stored in resin pot 12 and valve 9 opened, while the matrix resin 10 was distributed into the molding surface with grooves through the resin injection line, the resin was impregnated in the thickness direction of carbon fiber woven fabric laminate 4 from the lower side toward the upper side, and the laminate 4 with a thickness of 25 mm was completely impregnated with the resin without generating a non-impregnated portion. After resin impregnation, valve 9 was closed to stop the supply of the resin, the whole was heated to 130° C. at about 2° C./min., and that state was held for 2 hours. The matrix resin was cured and, thereafter, the temperature lowered to room temperature at about 2° C./min., and the whole was taken out from the mold and the bag material 8 removed. By delaminating the peel ply from the cured material, the cured resin adhered on the surface of the molded product, the medium and the porous sheet were removed and the surface of the molded product appeared, and a surface good in surface flatness was obtained for the surface having contacted with the porous sheet, although an irregularity, which was a trace of the medium, was observed on the surface having contacted with the medium.

Example 4

In the molding apparatus for RTM shown in FIG. 4, using the mold processed with #-type grooves 30 for resin distribution (a groove having a rectangular cross section with a width of 1 mm and a depth 3 mm and the pitch of the grooves is 8 mm), resin pot 12 was connected to the grooves via valve 9. Porous sheet 20 (stainless steel punching metal with a thickness of 0.2 mm, in which holes each having a diameter of 1 mm were processed at a pitch of 15 mm) was disposed on the molding surface. Thereon, peel ply 3a was disposed and, thereon, reinforcing fiber substrate 4 comprising carbon fiber woven fabrics (produced by Toray Industries, Inc., unidirectional woven fabric using carbon fibers T800S, weight: 190 g/m$^2$) laminated by 128 plies was disposed. Peel ply 3b was disposed on reinforcing fiber substrate 4. Thereon, medium 5 of a polypropylene mesh material (produced by Tokyo Polymer Corporation, "Netron"TSX-400P) was disposed and, thereon, evacuation gates 6d, 6e were placed and connected to vacuum pump 11. The whole of those members was covered with bag material 8 by a double bag system and the circumferential portion sealed by sealant 7. Valve 9 was closed, the inside of the cavity covered with bag material 8 was reduced in pressure by vacuum pump 11, and the whole heated at 60° C. in an oven and that state maintained for one hour. When thermoplastic epoxy matrix resin 10 (the resin viscosity at 60° C. (injection temperature): 200 mPa·s, the resin viscosity after expiration of one hour at 60° C.: 300 mPa·s) was stored in resin pot 12 and valve 9 was opened, while the matrix resin 10 was distributed into the molding surface with grooves through the resin injection line, the resin was impregnated in the thickness direction of carbon fiber woven fabric laminate 4 from the lower side toward the upper side. However, when that state is held, at the time when the impregnation progresses to a position of about ⅔ of the thickness of reinforcing fiber substrate 4, the resin impregnation becomes astringent.

Accordingly, when the resin was impregnated up to a position of ½ of the thickness of reinforcing fiber substrate 4, valve 41 was stopped, valve 42 opened and evacuation gate 6d switched to a resin injection gate. The resin injected from gate 6d was distributed in distribution medium 5 in a direction toward evacuation gate 6e, and the resin impregnated into the substrate in the downward direction via the inside of the medium 5. Finally, the resin was impregnated over the entire area of the inside of the substrate. Then, valve 9, 42 were closed to stop the supply of the resin.

The whole was heated to 130° C. at about 2° C./min. and that state held for 2 hours, The matrix resin was cured and, thereafter, the temperature lowered to room temperature at about 2° C./min., and the whole was taken out from the mold and the bag material 8 was removed. By delaminating the peel ply from the cured material, the cured resin adhered on the surface of the molded product, the medium and the porous sheet were removed and the surface of the molded product appeared, and a surface good in surface flatness was obtained for the surface having contacted with the porous sheet, although an irregularity, which was a trace of the medium, was observed on the surface having contacted with the medium.

Example 5

In the molding apparatus for RTM shown in FIG. 5, as gas permeable substrate 51 on the molding surface of mold 1, "peel ply #60001" produced by a US company, Richmond Corporation, was disposed and, thereon, a vapor permeable release film "E3760" which was used in "T.S.B. System" produced by a US company, Richmond Corporation, was disposed as gas permeation film 50 having a releasing property, and all the circumference sealed by a nitfurone tape 52 having a thermal resistance. The degasification space surrounded by gas permeation film 50 and mold 1 was connected to vacuum pump 11 through degasification port 53 provided in the mold 1.

Successively, reinforcing fiber substrate 4 (thickness: about 25 mm) comprising carbon fiber woven fabrics (produced by Toray Industries, Inc., plain weave fabric CO6343 using carbon fibers T300, weight: 200 g/m$^2$) laminated by 120 plies was disposed on gas permeation film 50.

Next, peel ply 3b was disposed on reinforcing fiber substrate 4. Thereon, resin distribution medium 5 of a polypropylene mesh material (produced by Tokyo Polymer Corporation, "Netron"TSX-400P) was disposed and, thereon, resin injection gate 6f was placed and connected to resin pot 12 via valve 9. The whole of those members was covered with bag material 8 and the circumferential portion sealed by sealant 7. Valve 9 was closed, the inside of the cavity covered with bag material 8 was evacuated and reduced in pressure by vacuum pump 11, and the whole heated at 70° C. in an oven and that state maintained for one hour. When thermoplastic epoxy matrix resin 10 (the resin viscosity at 70° C. (injection temperature): 130 mPa·s, the resin viscosity after expiration of one hour at 70° C.: 320 mPa·s) was stored in the resin pot and valve 9 opened, while the matrix resin 10 was distributed into the medium 5 through the resin injection line, the resin was impregnated in the thickness direction of reinforcing fiber substrate 4 from the upper side toward the lower side. In this case, if gas permeation film 50 does not exist, the gas present near the lower surface of the substrate is not well exhausted, the surface of the molded material obtained becomes "pock-marked-like", but, in this example, by providing gas permeation film 50, a degasification space was formed between the film and mold 1, the above-described gas was completely degasified from the entire area of the lower surface of reinforcing fiber substrate 4 through gas permeable substrate 51 and, therefore, in spite of the thickness of the substrate of 25 mm, the resin was completely impregnated without any non-impregnated portion and, in particular, the surface quality was remarkably improved. After resin impregnation, at the stage where a predetermined amount of resin was injected, valve 9 was closed to stop the supply of the resin, the whole heated to 130° C. at about 2° C./min, and that state held for 2 hours. The matrix resin was cured. Thereafter, the temperature was lowered to room temperature at about 2° C./min. and the whole was taken out from the mold and the bag material 8 removed. The lower surface of the cured molded product was obtained as a surface having a good surface flatness by delaminating gas permeation film 50.

Example 6

In the molding apparatus for RTM shown in FIG. 6, similarly to Example 5, as gas permeable substrate 51 on the molding surface of mold 1, "peel ply #60001" produced by a US company, Richmond Corporation, was disposed and, thereon, a vapor permeable release film "E3760", which was used in "T.S.B. System" produced by a US company, Richmond Corporation, was disposed as gas permeation film 50 having a releasing property, and all the circumference was sealed by a nitfurone tape 52 having a thermal resistance. The degasification space surrounded by gas permeation film 50 and mold 1 was connected to vacuum pump 11 through degasification port 53 provided in the mold 1.

Successively, reinforcing fiber substrate 4 (thickness: about 25 mm) comprising carbon fiber woven fabrics (produced by Toray Industries, Inc., plain weave fabric CO6343 using carbon fibers T300, weight: 200 g/m$^2$) laminated by 120 plies was disposed on gas permeation film 50. At that time, evacuation gate 6a was disposed also on one side of the lower surface of the reinforcing fiber substrate.

Peel ply 3b was disposed on reinforcing fiber substrate 4. Thereon, resin distribution medium 5 of a polypropylene mesh material (produced by Tokyo Polymer Corporation, "Netron"TSX-400P) was disposed and, thereon, two resin injection gates 6g, 6h were placed and connected to resin pot 12 via valve 9. The whole of those members was covered with bag material 8 and the circumferential portion sealed by sealant 7. Valve 9 was closed, the inside of the cavity covered with bag material 8 evacuated and reduced in pressure by vacuum pump 11, and the whole heated at 70° C. in an oven and that state maintained for one hour. When thermoplastic epoxy matrix resin 10 (the resin viscosity at 70° C. (injection temperature): 130 mPa·s, the resin viscosity after expiration of one hour at 70° C.: 320 mPa·s) was stored in the resin pot and valve 9 opened, while the matrix resin 10 flowed in medium 5 simultaneously through two resin injection lines and the resin was distributed on the surface, the resin impregnated in the thickness direction of reinforcing fiber substrate 4 from the upper side toward the lower side, and the substrate with a thickness of about 25 mm was impregnated completely without any non-impregnated portion.

At that time, although the resin reached the lower surface of reinforcing fiber substrate 4 quickly in the area immediately under injection gates 6g, 6h, namely, the resin reached slowly in the lower surface of the reinforcing fiber substrate in the intermediate area positioned between the two gates, finally the resin was completely impregnated by evacuation due to the degasification route of gas permeation film 50.

After resin impregnation, at the stage where a predetermined amount of resin was injected, valve 9 was closed to stop the supply of the resin, the whole heated to 130° C. at about 2/min., and that state held for 2 hours. The matrix resin was cured. The time for resin impregnation was short by the evacuation also through evacuation gate 6a, as compared to that in Example 5.

Thereafter, the temperature was lowered to room temperature at about 2/min., and the whole was taken out from the mold and the bag material 8 removed. The lower surface of the cured molded product was obtained as a surface having a good surface flatness by delaminating gas permeation film 50.

Example 7

In the molding apparatus for RTM shown in FIGS. 7 and 8, a carbon fiber woven fabric cut at a length of 500 mm and a width of 500 mm was laid up on mold 1 comprising a stainless steel flat plate. A reinforcing fiber material used to form a reinforcing fiber substrate was a unidirectional woven fabric CZ8431DP (weight: 190 g/m$^2$) of "TORAYCA" T800S produced by Toray Industries, Inc., and it was laminated by 128 plies totally. Peel ply 3 (NYLON taffeta) and resin distribution medium 5 (polypropylene mesh material) were disposed on the reinforcing fiber substrate 4, resin injection port 6j and evacuation port 6i were disposed relative to the substrate, the whole of these members was covered with bag material 8 (NYLON film) and the circumferential portion sealed by sealant 7 made of a synthetic rubber having a high adhesive property (the bag was applied as a double bag system although omitted in the figure).

In this state, valves A1, A2 were closed, valve A3 opened, and the evacuation carried out through the evacuation port via the vacuum line and vacuum trap 13 to reduce pressure in the cavity to 0.1 MPa or less. Thereafter, the mold was placed in an electric oven and the inside of the oven heated at 60° C. After the temperature of the whole of reinforcing fiber substrate reached 60° C., valve A1 was opened and matrix resin 10 injected through resin injection port 6j at a vacuum pressure. As the resin, an epoxy resin (the resin viscosity at 60° C. (injection temperature): 200 mPa·s, the resin viscosity after expiration of one hour at 60° C.: 300 mPa·s) was used. The injected resin was impregnated into the substrate 4 while flowing in resin distribution medium 5 having a low flow resistance. At the time when the resin was injected by a predetermined amount of 3650 cm$^3$, valve A1 was closed to stop the supply of the resin. At that time, the fiber volume content of the substrate capable of being estimated from the thickness of the reinforcing fiber substrate was about 48%.

Next, valve A2 was opened, the resin injection line opened to the vacuum side via the vacuum trap and excessive resin in the reinforcing fiber substrate was evacuated into the vacuum trap 13 from the end portion of the reinforcing fiber substrate. Thereafter, at the time when the evacuation amount of the resin reached a predetermined amount of 1150 cm$^3$, valves A2, A3 were closed to stop the supply of the resin. Then, the temperature in the electric oven was elevated to 130° C., heated and cured for about two hours. After heat-curing, the sub members such as the bag material were removed, CFRP (carbon fiber reinforced plastic) molded material was released from the molding surface. As the result of determination of the fiber volume content of the CFRP molded material at positions of the resin injection side, the evacuation side and an intermediate point therebetween, they were in a range of 57.2% to 58.2%. Namely, as compared to the time before resin evacuation immediately after resin impregnation, the fiber volume content could be increased to the range of the target value.

Example 8

In the above, a carbon fiber woven fabric 4 cut at a length of 500 mm and a width of 500 mm was laid up on mold 1 comprising a stainless steel flat plate on which #-type grooves 30 (width: 1 mm, depth: 4 mm, pitch: 15 mm) were processed as a flow path of resin. The carbon fiber woven fabric 4 was a unidirectional woven fabric CZ8431DP (weight: 190 g/m$^2$) of "TORAYCA" T800S produced by Toray Industries, Inc., and laminated by 128 plies totally. On this substrate, gas permeable material 23 (polyester nonwoven fabric) was disposed via peel ply 3 and, thereon, evacuation port 6i was disposed. Further, resin injection port 6j was disposed on the grooves 30 for resin flow path formed on mold 1, the whole of these members was covered with bag material 8 (NYLON film) by a double bag system and the circumferential portion sealed by sealant 7 made of a synthetic rubber having a high adhesive property.

In that state, valves A1, A2 were closed, valve A3 opened and evacuation was carried out through evacuation port 6i via the vacuum line and vacuum trap 13 to reduce the pressure in the cavity to 0.1 MPa or less. Thereafter, the mold was placed in an electric oven and the inside of the oven heated at 60° C. After the temperature of the whole of the reinforcing fiber substrate reached 60° C., valve A1 was opened and matrix resin 10 injected through resin injection port 6j at a vacuum pressure. The epoxy resin of Example 1 was used. The injected resin was distributed in the grooves for distributing resin and the resin in the grooves was impregnated into the substrate. As the result of measuring the thickness after the resin was impregnated into the whole of the reinforcing fiber substrate, it was 28.1 mm, and the fiber volume content was 48%.

Next, valve A1 was closed and valve A2 opened, and excessive resin in the reinforcing fiber substrate was evacuated into vacuum trap 13. In this example, the target fiber volume content of the CFRP molded material was set at 55 to 60%. Since it was recognized from the experimental result beforehand that the curing shrinkage of the molded material in the thickness direction was about 1.2%, at the time when the thickness became 23.8 mm, valves A2, A3 were closed to stop evacuation of the resin. Thereafter, the temperature in the oven was elevated to 130° C., heated and cured for about two hours. After heat-curing, the sub members such as the bag material were removed and, as the result of taking out the CFRP molded material from the molding surface, a CFRP molded material having a fiber volume content of 57.1 to 59.3% (thickness: 23.5 mm) within a range of the above-described target fiber volume content could be obtained.

Example 9

Our method was applied to the molding of a thick flat plate. In the apparatus shown in FIG. 9, a carbon fiber woven fabric 4 (reinforcing fiber material) cut at a length of 300 mm and a width of 300 mm was laid up on mold 1, comprising a stainless steel flat plate, by 128 plies, to form reinforcing fiber material laminate 4A having a total thickness of about 25 mm. The reinforcing fiber material was a unidirectional woven fabric CZ8431DP (weight: 190 g/m$^2$) of "TORAYCA" T800S produced by Toray Industries, Inc. Further, peel ply 3 (NYLON taffeta) was disposed on reinforcing fiber material laminate 4A, resin distribution medium 5 (polypropylene mesh material) were disposed relative to both end surfaces 4a, 4b of the laminate 4A, resin injection port 6m and evacuation port 6k were disposed to communicate with both ends of the laminate 4A, the whole of those members was covered with bag material 8 (NYLON film) (by a double bag system, although omitted in the figure) and the circumferential portion was sealed by sealant 7 made of a synthetic rubber having a high adhesive property.

Then, valve A1 was closed, valve B1 opened and evacuation port 6k was communicated with the vacuum line via vacuum trap 13 communicated with the evacuation line, and the pressure in the cavity reduced to 0.1 MPa or less.

Thereafter, the mold was placed in an electric oven and the inside of the oven was heated at 60° C. After the temperature of the whole of reinforcing fiber substrate reached 60° C., valve A1 was opened and matrix resin 10 injected through resin injection port 6m under a pressure-reduced atmosphere with 0.08 to 0.1 MPa. As the injected resin, an epoxy resin (the resin viscosity at 60° C. (injection temperature): 200 mPa·s, the resin viscosity after expiration of one hour at 60° C.: 300 mPa·s) was used. The injected resin first flowed in resin distribution medium 5 having a low flow resistance, and at the time reaching the end of reinforcing fiber material laminate 4A, the resin flowed therefrom mainly in the laminate 4A in the direction along the lamination surface of the laminate 4A and, thereafter, the resin was impregnated in the thickness direction and this resin flow was observed from the above position of transparent bag material 8.

At the time when the predetermined amount of resin was injected, valve A1 was closed to stop the supply of the resin. Thereafter, the temperature in the oven was elevated to 130° C., heated and cured for about two hours. After heat-curing, the sub members such as the bag material 8 were removed and the CFRP molded material was taken out from the molding surface. As a result, the CFRP molded material was completely impregnated with resin in spite of a relatively small thickness of 25 mm. Further, the surface property of the molded material was flat.

Example 10

Our method was applied to the molding of a skin/stringer integrally structural material. In the apparatus shown in FIG. 10, a carbon fiber woven fabric 4 (reinforcing fiber material) cut at a length of 500 mm and a width of 500 mm was laid up on mold 1 to form reinforcing fiber material laminate 4B. The reinforcing fiber material was a unidirectional woven fabric (weight: 190 g/m$^2$) of "TORAYCA" T800S produced by Toray Industries, Inc., and laminated by 128 plies totally (hereinafter, referred to as "reinforcing fiber material laminate for forming a skin material 4B"). Next, a carbon fiber woven fabric 4 cut at a width of 98 mm and a length of 500 mm was placed by 32 plies using jig 14 for fixing a C-type shape. Another laminate of the carbon fiber woven fabric 4 was further prepared and the two laminates were disposed to form a structure back to back symmetrically with jigs 14 disposed at both sides to form a reinforcing fiber material laminate having an I-type cross section. It was placed on the reinforcing fiber material laminate that forms a skin material 4B which had been already been laid up. Then, on the I-type reinforcing fiber material laminate, a carbon fiber woven fabric 4 cut at a width of 66 mm and a length of 500 mm was laid up by 32 plies (hereinafter, the reinforcing fiber material laminate placed on the reinforcing fiber material laminate that forms a skin material 4B is referred to as "reinforcing fiber material laminate that forms a stringer material 4C").

Next, peel ply 3 (NYLON taffeta), resin distribution medium 5 (polypropylene mesh material), resin injection ports 6m, 6n and evacuation ports 6k, 6l were disposed on these reinforcing fiber material laminates, as shown in FIG. 10. Then, the whole of those members was covered with bag material 8 (NYLON film) by a double bag system, and the circumferential portion sealed by sealant 7 made of a synthetic rubber having a high adhesive property. As to evacuation, valves A4, A5 were closed, valves B1, B2 opened and evacuation ports 6k, 6l opened via vacuum trap 13 communicated with the vacuum line, and the pressure in the cavity reduced to 0.1 MPa or less.

After bagging and the pressure reducing were finished, the mold was placed in an electric oven and the inside of the oven was heated at 70° C. When the temperature of the whole of the reinforcing fiber material laminate reached 70° C., valves A4, A5 were opened and matrix resin 10 injected through resin injection ports 6m, 6n under a pressure-reduced condition. An epoxy resin (the resin viscosity at 70° C. (injection temperature): 130 mPa·s, the resin viscosity after expiration of one hour at 60° C.: 320 mPa·s) was used. The injected resin flowed in the resin distribution medium having a low flow resistance and was impregnated into the substrate. Although the resin was impregnated in the thickness direction relative to the reinforcing fiber material laminate that forms a skin material 4B, relative to the reinforcing fiber material laminate that forms a stringer material 4C, the resin flowed in the direction of portions between layers of the laminate from the end surface of the lower side of the I-type reinforcing fiber material laminate, and was impregnated mainly in the thickness direction of the respective reinforcing fiber materials (namely, the thickness direction of the I-type reinforcing fiber material laminate) after being permeated into the I-type reinforcing fiber material laminate. At the time when the predetermined amount of resin was injected, valves A4, A5 were closed to stop the supply of the resin. Thereafter, the temperature in the oven was elevated to 130° C., heated and cured for about two hours. After heat-curing, the sub members such as the bag material 8 were removed and the CFRP molded material was taken out from the molding surface. In the CFRP molded material obtained, the resin was completely impregnated particularly up to the corners of the stringer part. Further, the surface property of the stringer part was flat.

Example 11 ur method was applied to the molding of a panel with a step. In the apparatus shown in FIG. 11, a carbon fiber woven fabric 4 (produced by Toray Industries, Inc., plain weave fabric CO6343 using carbon fibers T300, weight: 190 g/m$^2$) cut at a length of 500 mm and a width of 500 mm was laid up by 24 plies on mold 1 of an aluminum flat plate, and thereon, the carbon fiber woven fabric cut at a length of 150 mm and a width of 500 mm was laid up by 56 plies was laid up as a thick plate portion, to form reinforcing fiber material laminate 4D. As shown in FIG. 11, on the whole of the reinforcing fiber material laminate, peel ply 3 (NYLON taffeta) was disposed, resin distribution medium 5 (polypropylene mesh material) was disposed to extend up to one end surface of the reinforcing fiber material laminate 4D, resin injection port 6o and evacuation ports 6a, 6b were disposed as shown in FIG. 11, the whole of these members covered with bag material 8 (NYLON film) by a double bag system, and the circumferential portion sealed by sealant 7 made of a synthetic rubber having a high adhesive property. Valves B1, B2 were opened at a condition where valves A1, A2 were closed and the pressure in the cavity was reduced to 0.1 MPa or less by vacuum pump 11 through the vacuum line via vacuum trap 13.

Thereafter, the mold was placed in an electric oven and the inside of the oven heated at 70° C. Valve A1 was opened, and matrix resin 10 (an epoxy resin (the resin viscosity at 70° C. (injection temperature): 130 mPa·s, the resin viscosity after expiration of one hour at 60° C.: 320 mPa·s)) injected through resin injection port 6o under a pressure-reduced condition. Although the injected resin flowed in the resin distribution medium 5 having a low flow resistance and permeated and impregnated into the thin plate portion in the lamination direction, as to the thick plate portion, the resin permeated into the portions between layers of the laminate through the part of the resin distribution medium disposed in the direction of the surface perpendicular to the lamination direction and, then, the resin was impregnated in the thickness direction of the laminate. At the time when flowing out of the resin from evacuation port 6b was observed, valve B2 was closed and valve A2 opened, the resin injection was carried out. Next, at the time when flowing out of the resin from evacuation port 6a was observed, valves A1, A2 were closed to stop resin injection, the electric oven was heated to 130° C., and the resin cured for about two hours at a constant temperature condition. After heat-curing, the sub members such as the bag material 8 were removed and the CFRP molded material taken out from the molding surface. In the CFRP molded material obtained, the resin was completely impregnated particularly as to all portions of the thin plate portion and the thick plate portion, and the surface property of the stringer part was flat.

INDUSTRIAL APPLICATIONS

Our methods of RTM molding are suitable particularly for molding of a thick FRP structural material and an FRP structural material having an excellent designability, or having excellent lightweight property and strength by increase of fiber volume content, can be molded.

What we claim is:

1. A method of RTM molding comprising:
   placing a reinforcing fiber substrate in a mold,
   placing resin distribution media each exhibiting a resin flow resistance lower than a resin flow resistance of said reinforcing fiber substrate on both surfaces of said reinforcing fiber substrate, interposing 1) a porous sheet having a) a stiffness such that influence of irregularities of the distribution media is not reflected and b) a flatness equal to a surface roughness required for a final product or more and 2) a peel ply, and capable of being passed with resin between at least one resin distribution medium and said reinforcing fiber substrate, and
   after pressure in said mold is reduced by evacuation, injecting a resin into said mold through said resin distribution media to impregnate said reinforcing fiber substrate with said resin injected,
   wherein a resin flow resistance of a first resin distribution medium placed on a first surface of said reinforcing fiber substrate is lower than a resin flow resistance of a second resin distribution medium placed on a second surface of said reinforcing fiber substrate, and said evacuation is carried out through said second resin distribution medium while said resin is injected into said first resin distribution medium to impregnate said reinforcing fiber substrate with said resin injected.

2. The method according to claim 1, wherein said reinforcing fiber substrate comprises a laminate of reinforcing fiber materials.

3. The method according to claim 2, wherein said resin flow resistance of said first resin distribution medium is about ⅓ of said resin flow resistance of said reinforcing fiber substrate or less.

4. The method according to claim 2, further comprising interposing a peel ply capable of being removed together with a resin distribution medium after molding between at least one resin distribution medium and said reinforcing fiber substrate.

5. The method according to claim 2, further comprising interposing a porous sheet between at least one resin distribution medium and said reinforcing fiber substrate.

6. The method according to claim 1, wherein said resin flow resistance of said first resin distribution medium is about ⅓ of said resin flow resistance of said reinforcing fiber substrate or less.

7. The method according to claim 6, further comprising interposing a peel ply capable of being removed together with a resin distribution medium after molding between at least one resin distribution medium and said reinforcing fiber substrate.

8. The method according to claim 6, further comprising interposing a porous sheet between at least one resin distribution medium and said reinforcing fiber substrate.

9. The method according to claim 6, wherein said resin flow resistance of said first resin distribution medium is about 1/10 of said resin flow resistance of said reinforcing fiber substrate or less.

10. The method according to claim 9, further comprising interposing a peel ply capable of being removed together with a resin distribution medium after molding between at least one resin distribution medium and said reinforcing fiber substrate.

11. The method according to claim 1, further comprising interposing a peel ply capable of being removed together with a resin distribution medium after molding between at least one resin distribution medium and said reinforcing fiber substrate.

12. The method according to claim 1, further comprising forming at least one resin distribution medium by providing a groove as a resin flow path on an inner surface of said mold.

13. The method according to claim 1, wherein injection of the resin is also started through said second resin distribution medium before said resin injected through said first resin distribution medium reaches said second surface.

14. The method according to claim 1, wherein, after the molded product is released from said mold, at least one resin distribution medium is left in said molded product without removing it from said molded product.

15. The method according to claim 1, wherein at least two resin injection gates are disposed above said first resin distribution medium, and resin injection is carried out simultaneously from at least two resin injection gates adjacent to each other, or from all resin injection gates.

* * * * *